US012028668B2

(12) United States Patent
Lin et al.

(10) Patent No.: US 12,028,668 B2
(45) Date of Patent: Jul. 2, 2024

(54) MICRO ELECTRO MECHANICAL SYSTEM SOUND WAVE TRANSDUCER

(71) Applicant: GLASS ACOUSTIC INNOVATIONS TECHNOLOGY CO., LTD., New Taipei (TW)

(72) Inventors: Hsiao-Yi Lin, New Taipei (TW); Kwun Kit Chan, New Taipei (TW); Yi Feng Wei, New Taipei (TW); Yao-Sheng Chou, New Taipei (TW)

(73) Assignee: GLASS ACOUSTIC INNOVATIONS TECHNOLOGY CO., LTD., New Taipei (TW)

( * ) Notice: Subject to any disclaimer, the term of this patent is extended or adjusted under 35 U.S.C. 154(b) by 197 days.

(21) Appl. No.: 17/738,015

(22) Filed: May 6, 2022

(65) Prior Publication Data

US 2022/0360876 A1 Nov. 10, 2022

Related U.S. Application Data

(60) Provisional application No. 63/185,640, filed on May 7, 2021.

(51) Int. Cl.
*H04R 1/08* (2006.01)

(52) U.S. Cl.
CPC ....... *H04R 1/083* (2013.01); *H04R 2201/003* (2013.01); *H04R 2499/11* (2013.01)

(58) Field of Classification Search
CPC .............. H04R 1/083; H04R 2201/003; H04R 2499/11
See application file for complete search history.

(56) References Cited

FOREIGN PATENT DOCUMENTS

| | | | | | |
|---|---|---|---|---|---|
| CN | 1105908 C | | 9/1999 | | |
| CN | 1105908 C | * | 4/2003 | ........... | G01L 9/0073 |
| CN | 108862185 A | | 11/2018 | | |
| TW | 201131843 A | | 9/2011 | | |
| WO | WO201602923 A1 | * | 6/2016 | ........... | B81B 7/0061 |

OTHER PUBLICATIONS

Office action dated Apr. 24, 2023 from the Taiwan corresponding application 111117187.
Brief English translation of the office action dated Apr. 24, 2023 from the Taiwan corresponding application 111117187.

* cited by examiner

*Primary Examiner* — Sunita Joshi
(74) *Attorney, Agent, or Firm* — WPAT, P.C.; Anthony King

(57) ABSTRACT

A sound wave transducer is provided. The sound wave transducer includes a first board, a spacer layer and a second board over the first board and the spacer layer. The first board includes a carrier, a first substrate layer and a first metal layer. The carrier has a first opening formed in a central region. The first substrate layer is disposed on the carrier and over the first opening. The first metal layer is disposed on the first substrate layer. The spacer layer is disposed on the first board and surrounds the central region. The second board includes a second substrate layer, a second metal layer disposed on the spacer layer, and a plurality of second openings penetrating through the second substrate layer and the second metal layer.

19 Claims, 24 Drawing Sheets

MICRO ELECTRO MECHANICAL SYSTEM SOUND WAVE TRANSDUCER

PRIORITY CLAIM AND CROSS-REFERENCE

This application claims the benefit of provisional application Ser. 63/185,640 filed on May 7, 2021. The above-referenced application is hereby incorporated herein by reference in its entirety.

BACKGROUND

With rapid development of both electronics and information industries, multimedia player devices are evolving with improved miniaturization and portability. For example, an electronic portable media player (PMP) and a digital audio player (DAP) are a portable electronic devices that can store and play multimedia files. The above-mentioned devices require speakers for playing sound, but existing speaker structures and manufacturing technology are disadvantageous for integration into multimedia player devices that need to be light, thin, and short. In order to cure such deficiency, the following technical means have been developed.

SUMMARY OF THE INVENTION

One aspect of the present invention provides a sound wave transducer. The sound wave transducer includes a first board, a spacer layer and a second board over the first board and the spacer layer. The first board includes a carrier, a first substrate layer and a first metal layer. A first opening is formed in a central region of the carrier. The first substrate layer is disposed on the carrier and over the first opening. The first metal layer is disposed on the first substrate layer. The spacer layer is disposed on the first board and surrounds the central region. The second board includes a second substrate layer, a second metal layer disposed on the spacer layer, and a plurality of second openings penetrating through the second substrate layer and the second metal layer.

Another aspect of the present invention provides a sound wave transducer module. The sound wave transducer module includes a first sound wave transducer, a first sealant wall, a top cover, and a first signal processing unit. The first sound wave transducer includes a first bottom board, a first spacer layer, and a first top board. The first bottom board includes a first glass layer, a first opening formed in a central region of the first glass layer, a first substrate layer disposed on the first glass layer and over the first opening, and a first metal layer disposed on the first substrate layer. The first spacer layer is disposed on the first bottom board and surrounds the central region of the first glass layer. The first top board has a plurality of second openings. The first top board further includes a second substrate layer and a second metal layer disposed on the first spacer layer. The first sealant wall is disposed on the first bottom board of the first sound wave transducer. The top cover is disposed on the first sealant wall. The first signal processing circuit is coupled to the first metal layer and the second metal layer.

DETAILED DESCRIPTION

In the following detailed description, numerous specific details are set forth in order to provide a thorough understanding of the present disclosure. However, it will be understood by those skilled in the art that the present disclosure may be practiced without these specific details. In other instances, well-known methods, procedures, components and circuits are not described in detail so as not to obscure the present disclosure.

The present invention provides a variety of embodiments useful in the realization of a diaphragm that provides significant performance advantages over other types of MEMS microphone used in a sound wave transducer.

The making and using of the embodiments of the present disclosure are discussed in detail below. It should be appreciated, however, that the provided subject matter provides many applicable inventive concepts that may be embodied in a wide variety of specific contexts. The specific embodiments discussed herein are merely illustrative and do not limit the scope of the provided subject matter.

Figure 1:
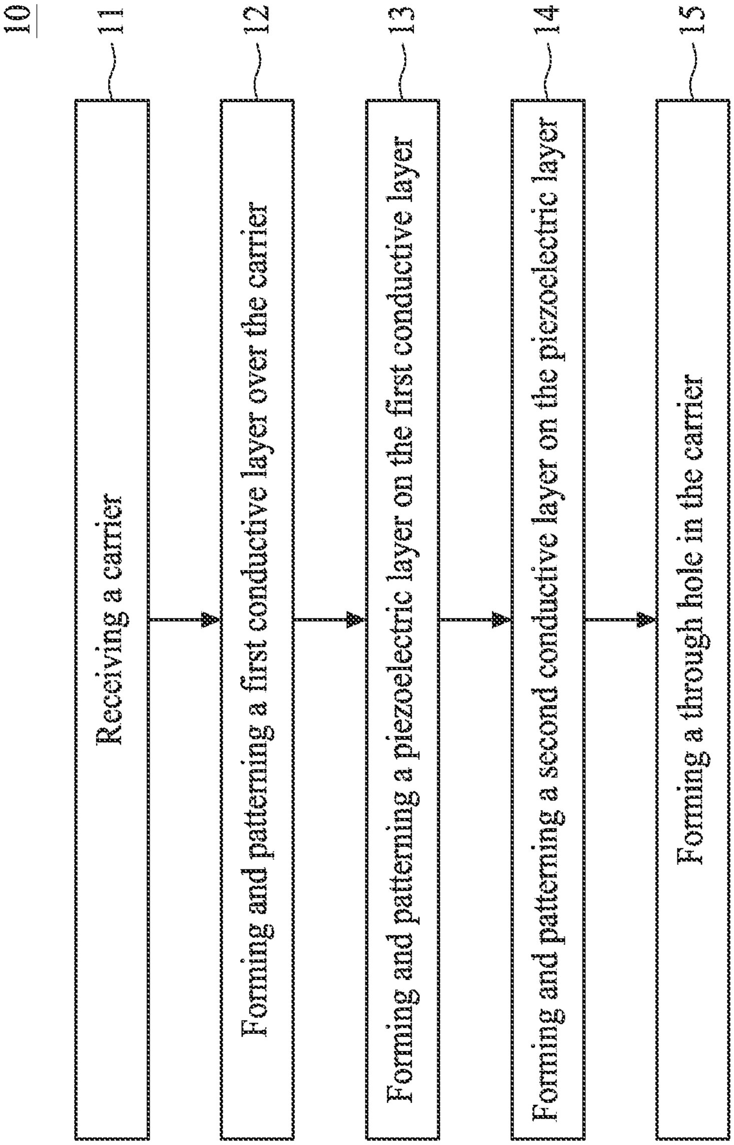
FIG. 1 is a flowchart of a method for forming a MEMS microphone in accordance with some embodiments of the present disclosure.

Referring to FIG. 1, FIG. 1 represents a method for forming a MEMS microphone 10 according to aspects of the present disclosure. The method 10 can be used to form different types of MEMS microphones. For example, in some embodiments, the method 10 is a method for forming a piezoelectric-based MEMS microphone. The method 10 includes a number of operations (11, 12, 13, 14 and 15). The method 10 will be further described according to one or more embodiments. It should be noted that the operations of the method 10 may be rearranged or otherwise modified within the scope of the various aspects. It should further be noted that additional processes may be provided before, during, and after the method 10, and that some other processes may be only briefly described herein. Thus, other implementations are possible within the scope of the various aspects described herein.

Figure 2A:
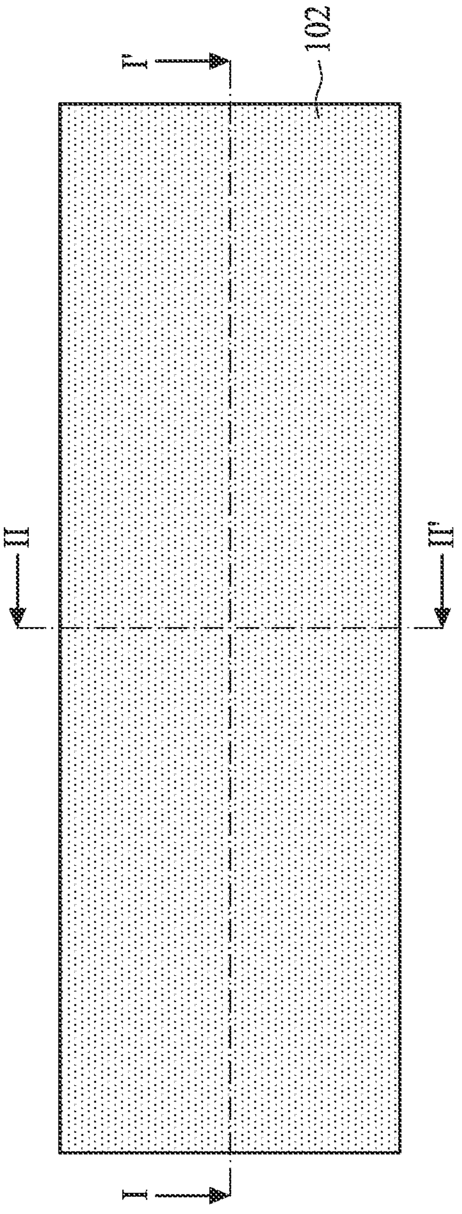
FIG. 2A is a top view of a MEMS microphone at a fabrication stage according to the method for forming the MEMS microphone in accordance with some embodiments of the present disclosure.
Figure 2B:
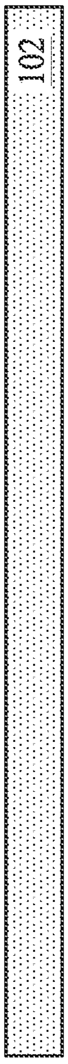
FIG. 2B is a cross-sectional view taken along line I-I' of FIG. 2A.
Figure 2C:
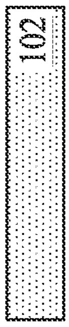
FIG. 2C is a cross-sectional view taken along line II-II' of FIG. 2A.

FIGS. 2A to 2C are schematic drawings of a MEMS microphone (i.e., a piezoelectric-based MEMS microphone) at various stages according to the method for forming the MEMS microphone in accordance with some embodiments of the present disclosure. In step 11, referring to FIG. 2A, a carrier 102 is received. In some embodiments, the carrier 102 may be glass, but the disclosure is not limited thereto. For example, as a material for the carrier 102, quartz, or a plastic made of fiberglass-reinforced plastics (FRP), polyvinyl fluoride (PVF), polyester, acrylic, or the like can be used. A shape of the carrier 102 may be adjusted according to different product requirements. For example but not limited thereto, the carrier 102 may have a rectangular shape, as shown in FIG. 2A. In some embodiments, the carrier 102 has a consistent thickness. In some alternative embodiments, the carrier may have a thickness gradient, which will be descried in the following description.

Figure 3A:
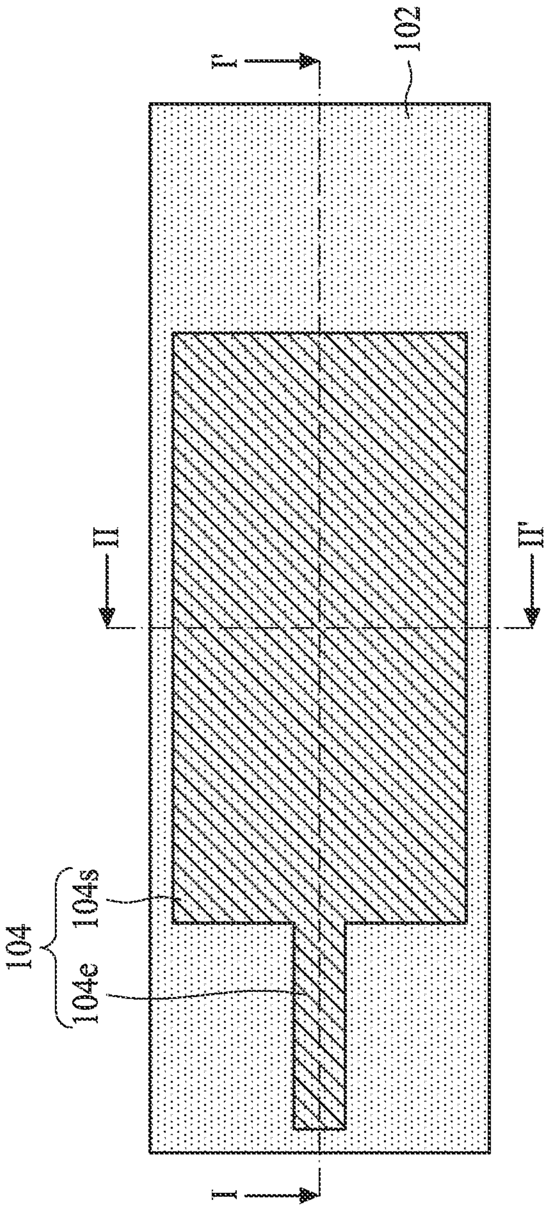
FIG. 3A is a top view of a MEMS microphone at a fabrication stage subsequent to the stage of FIG. 2A.
Figure 3B:
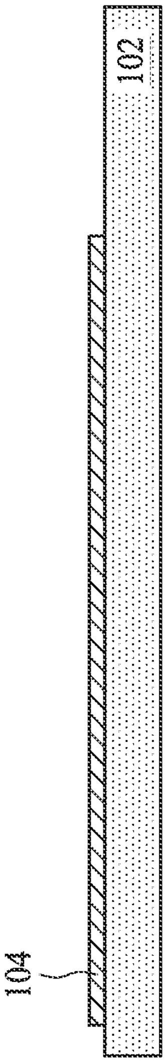
FIG. 3B is a cross-sectional view taken along line I-I' of FIG. 3A.
Figure 3C:
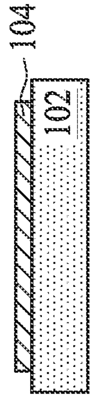
FIG. 3C is a cross-sectional view taken along line II-II' of FIG. 3A.

Referring to FIGS. 3A to 3C, in step 12, a conductive material is formed on the carrier 102 and patterned to form a first conductive layer 104. In some embodiments, the first conductive layer 104 may be patterned and defined to have a sensing portion **104*s* and a connecting portion 104*e*, as shown in FIG. 3A. The sensing portion 104*s* is coupled to the connecting portion 104*e*. A shape of the sensing portion 104*s* may be adjusted according to different product requirements. For example but not limited thereto, the sensing portion 104*s* of the first conductive layer 104 may have a rectangular shape, as shown in FIG. 3A. Further, as shown in FIGS. 3A to 3C, a portion of the carrier 102 is exposed through the first conductive layer 104**.

Figures 4A, 4B, 4C:
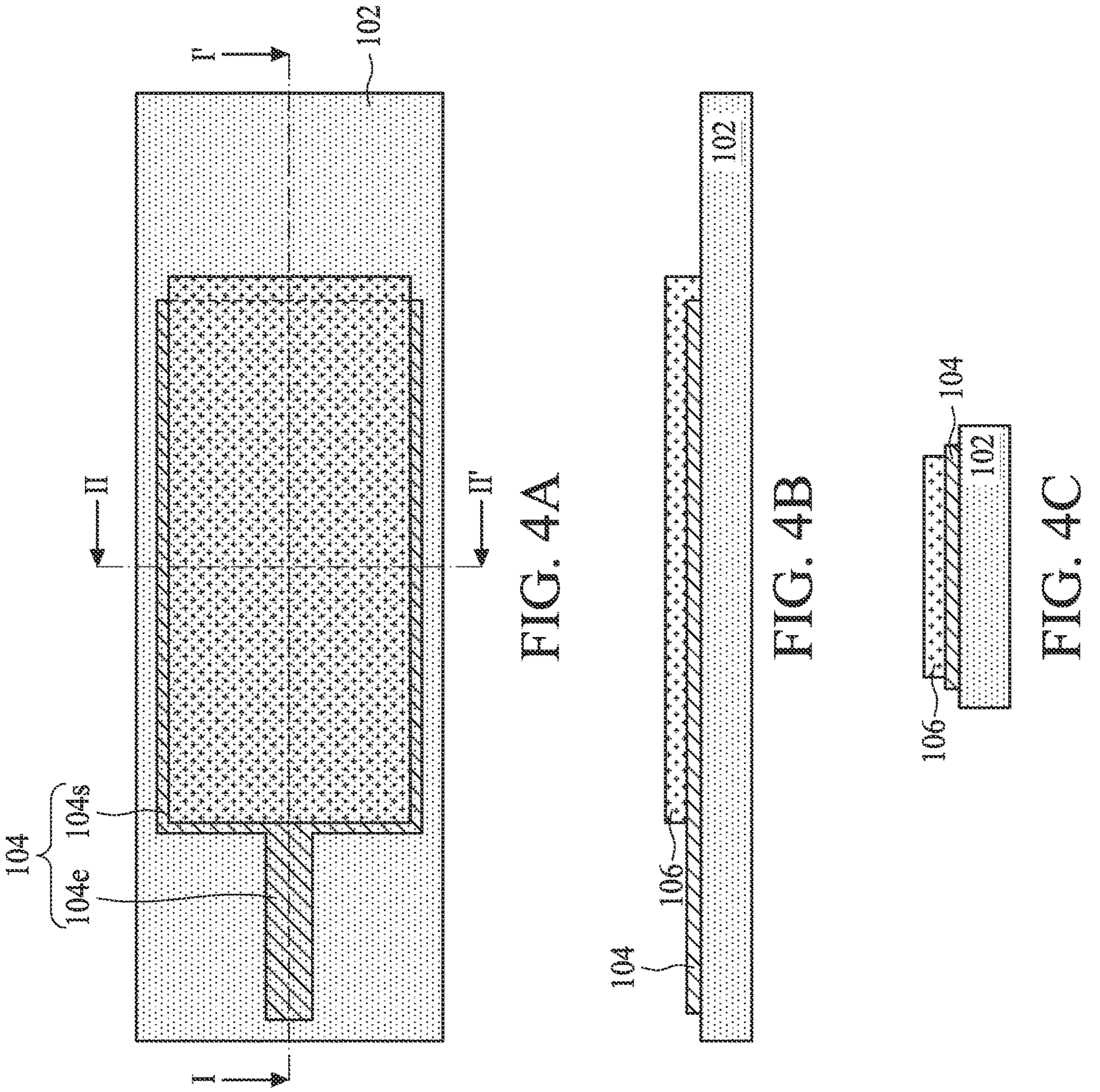
FIG. 4A is a top view of a MEMS microphone at a fabrication stage subsequent to the stage of FIG. 3A.
FIG. 4B is a cross-sectional view taken along line I-I' of FIG. 4A.
FIG. 4C is a cross-sectional view taken along line II-II' of FIG. 4A.

Referring to FIGS. 4A to 4C, in step 13, a piezoelectric material is formed and patterned to form a piezoelectric layer 106 on the first conductive layer 104. The piezoelectric material may include organic flexible materials such as ferroelectric polymer such as poly(vinylidene fluoride) (PVDF) or copolymer, poly (vinylidene fluoride-co-trifluoroethylene, P(VDF-TrFE)), or inorganic flexible materials such as PZT such as quartz, single crystal quartz, or any other suitable piezoelectric material, such as aluminum nitride (AlN), zinc oxide (ZnO), cadmium sulfide (CdS), lead titanate ($PbTiO_3$), lead zirconate titanate (PZT), lithium niobate ($LiNbO_3$), lithium tantalite ($LiTaO_3$), potassium niobate ($KNbO_3$), lithium tetraborate ($Li_2B_4O_7$, LTB), langasite ($La_3Ga_5SiO_{14}$), gallium arsenide (GaAs), barium sodium niobate ($Ba_2NaNb_5O_{15}$), bismuth germanium oxide ($Bi_{12}GeO_{20}$, BGO), indium arsenide (InAs), indium antimonide (InSb), or other non-centrosymmetric material, either in substantially pure form or in combination with one or more additional materials. A thickness of the piezoelectric layer 106 is between approximately 2 micrometers and approximate 30 micrometers, but the disclosure is not limited thereto. In some embodiments, the piezoelectric layer 106 is formed to cover a portion of the sensing portion **104*s* of the first conductive layer 104, and a portion of the carrier 102, as shown in FIGS. 4A and 4**B.

Figure 5A:
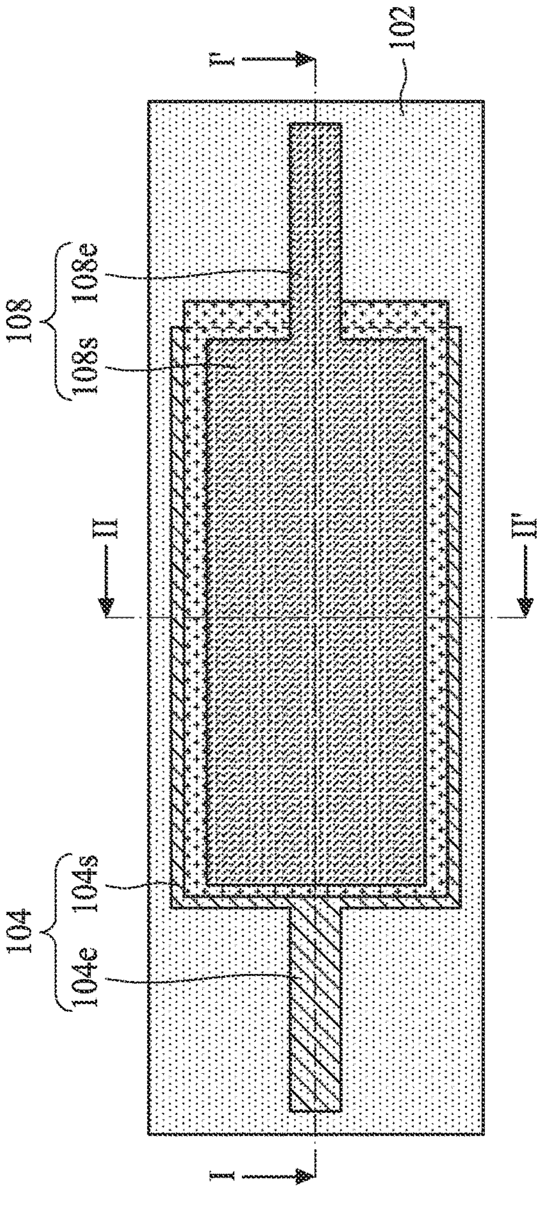
FIG. 5A is a top view of a MEMS microphone at a fabrication stage subsequent to the stage of FIG. 4A.
Figure 5B:
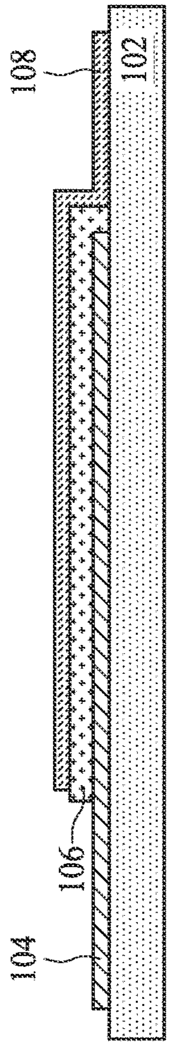
FIG. 5B is a cross-sectional view taken along line I-I' of FIG. 5A.
Figure 5C:
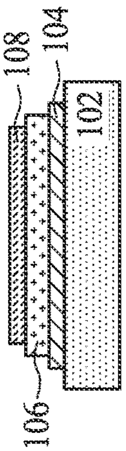
FIG. 5C is a cross-sectional view taken along line II-II' of FIG. 5A.

Referring to FIGS. 5A to 5C, in step 14, another conductive material is formed and patterned to form a second conductive layer 108 on the piezoelectric layer 106. In some embodiments, the second conductive layer 108 may be patterned and defined to have a sensing portion **108*s* and a connecting portion 108*e*, as shown in FIG. 5A. The sensing portion 108*s* is coupled to the connecting portion 108*e*. Further, as shown in FIG. 5A, the sensing portion 108*s* of the second conductive layer 108 overlaps the sensing portion 104*s* of the first conductive layer 104, and a portion of the carrier 102 is exposed through the first conductive layer 104. In some embodiments, the first conductive layer 104 and the second conductive layer 108 can include a same material, but the disclosure is not limited thereto. In some embodiments, a thickness of the first conductive layer 104 and a thickness of the second conductive layer 108 may be similar, but the disclosure is not limited thereto. Further, a shape of the sensing portion 108*s* of the second conductive layer 108 may be similar to that of the sensing portion 104*s* of the first conductive layer 104**, but the disclosure is not limited thereto.

Figures 6A, 6B, 6C:
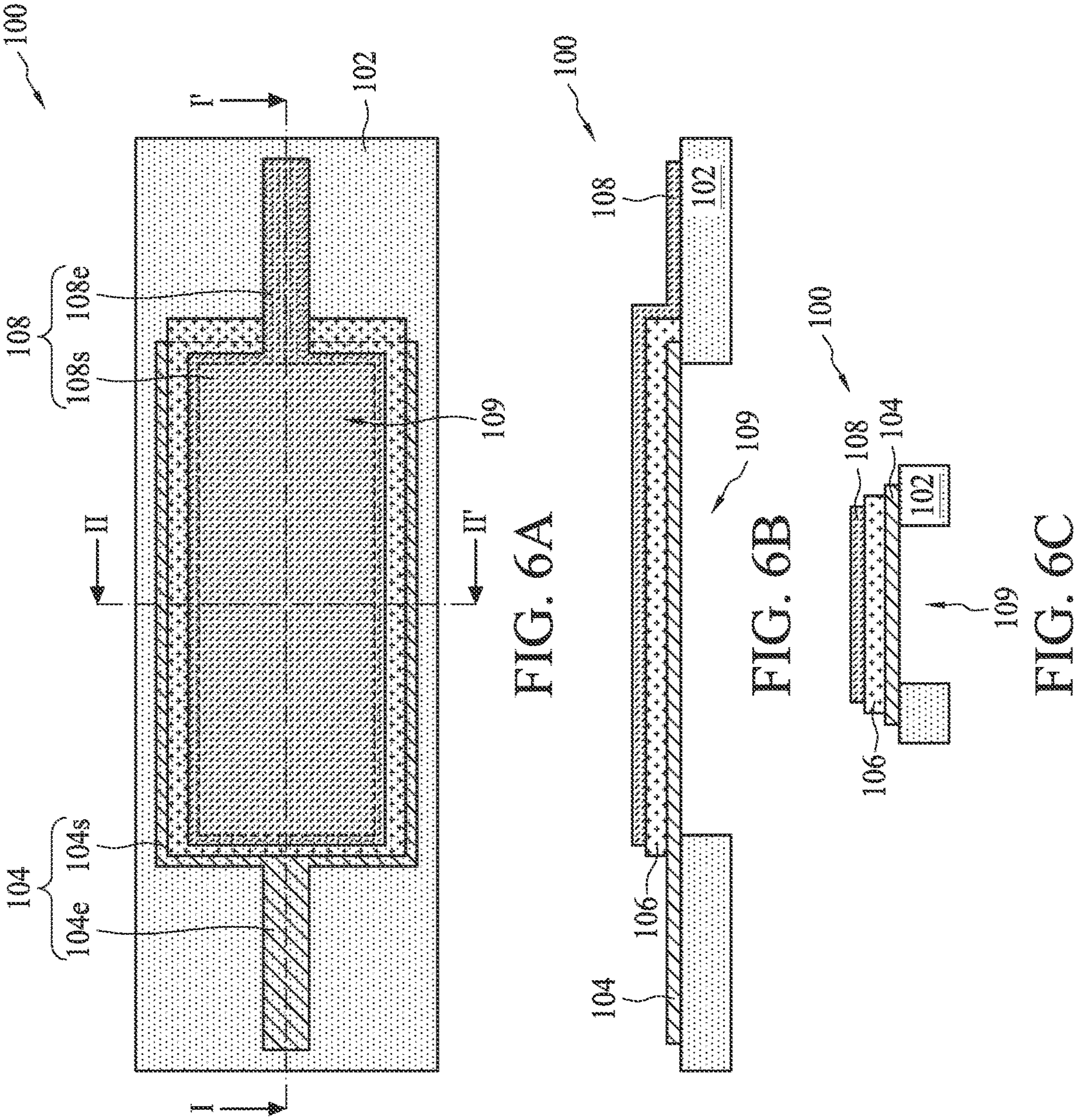
FIG. 6A is a top view of a MEMS microphone at a fabrication stage subsequent to the stage of FIG. 5A.
FIG. 6B is a cross-sectional view taken along line I-I' of FIG. 6A.
FIG. 6C is a cross-sectional view taken along line II-II' of FIG. 6A.

Referring to FIGS. 6A to 6C, in step 15, a through hole 109 is formed in the carrier 102. In some embodiments, a shape of the through hole 109 may corresponds to the sensing portions **104*s* of the first conductive layer 104 and the sensing portion 108*s* of the second conductive layer 108**.

For example, the through hole 109 may have a rectangular shape, but the disclosure is not limited thereto. In some embodiments, as shown in FIGS. 6A to 6C, a width of the through hole 109 is less than a width of the sensing portion 104*s* of the first conductive layer 104 and less than a width of the sensing portion 108*s* of the second conductive layer 108; similarly, a length of the through hole 109 is less than a length of the sensing portion 104*s* of the first conductive layer 104 and less than a length of the sensing portion 108*s* of the second conductive layer. Additionally, a portion of the sensing portion 104*s* of the first conductive layer 104 is exposed through the through hole 109.

Accordingly, a piezoelectric-based MEMS microphone 100 is obtained. The sensing portion 104*s* of the first conductive layer 104, the piezoelectric layer 106 and the sensing portion 108*s* of the second conductive layer 108 are movable elements of the piezoelectric-based MEMS microphone 100. The connecting portion 104*e* of the first conductive layer 104 and the connecting portion 108*e* of the second conductive layer 108 provide electrical connection to other devices, such as a signal processing unit or an application specific integrated circuit (ASIC), but the disclosure is not limited thereto. On the other hand, each material or layer can be formed on the carrier 102 using operations used to form thin-film transistor (TFT). Thus, the method 10 can be easily integrated in the TFT or in semiconductor manufacturing operations. Accordingly, a dimension of the piezoelectric-based MEMS microphone 100 may be reduced while yield rate is increased.

Figure 7:
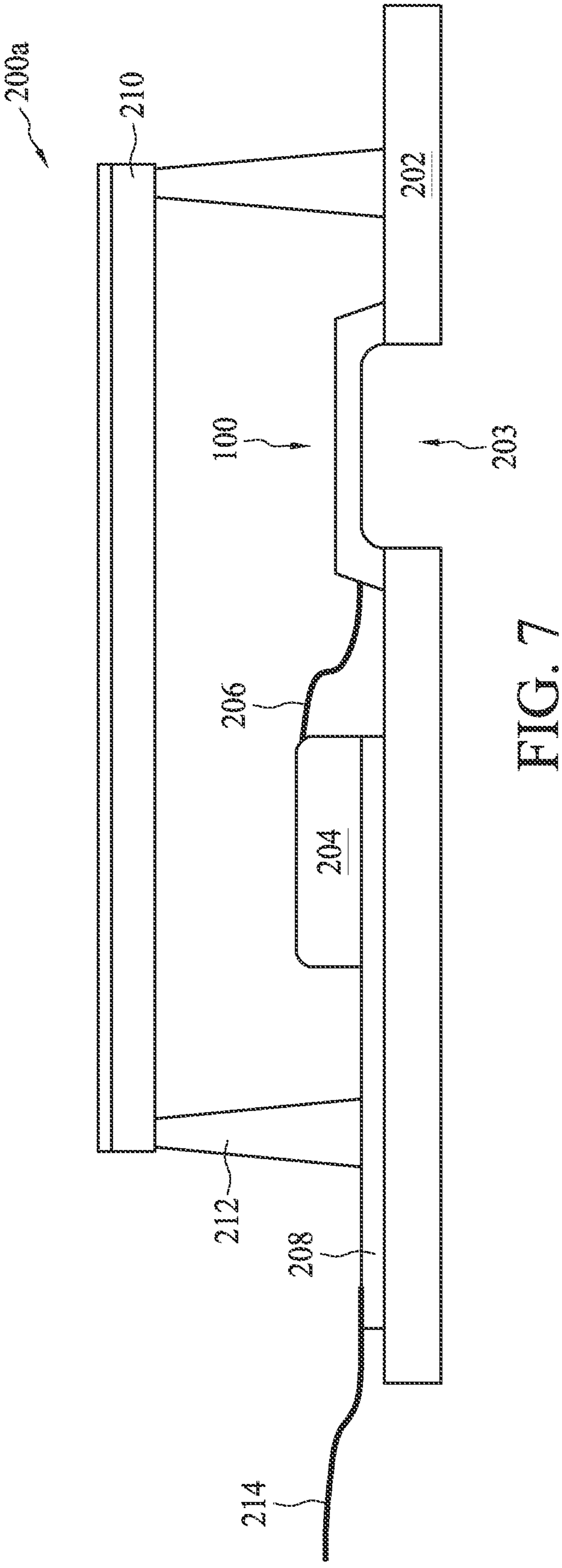
FIG. 7 is a schematic drawing illustrating a sound wave transducer including a piezoelectric-based MEMS microphone in accordance with some embodiments of the present disclosure.

Please refer to FIG. 7, which is a schematic drawing illustrating a sound wave transducer 200*a* in accordance with some embodiments of the present disclosure. In some embodiments, the piezoelectric-based MEMS microphone 100 is integrated in the sound wave transducer 200*a*. The sound wave transducer 200*a* may include a substrate 202, such as a glass substrate. Alternatively, the substrate 202 can be comprised of quartz, a plastic made of fiberglass-reinforced plastics (FRP), polyvinyl fluoride (PVF), polyester, acrylic or the like. In some embodiments, the substrate 202 may be used as the carrier 102 of the piezoelectric-based MEMS microphone 100. In such embodiments, the through hole 109 shown in FIGS. 6A to 6C is the through hole 203 shown in FIG. 7.

The piezoelectric-based MEMS microphone 100 is disposed on the substrate 202, and is electrically connected to a chip 204 through a wiring 206. In some embodiments, the chip 204 may be a signal processing unit or an ASIC, but the disclosure is not limited thereto. Further, the chip 204 is electrically connected to another device through a wiring line 208 formed over the substrate 202. A cap or top cover 210 is disposed over the substrate 202 and fixed to the substrate 202 by a sealant 212. The sealant 212 may be an epoxy-based resin. It is preferable that such material allow as little moisture and oxygen as possible to penetrate the sealant 212. Further, a thickness of the sealant 212 may define a distance between the top cover 210 and the substrate 202, but the disclosure is not limited thereto.

In some embodiments, an anisotropic conductive film (ACF) 214 may be used to provide an electrical connection between the sound wave transducer 202*a* and another device.

Figure 8:
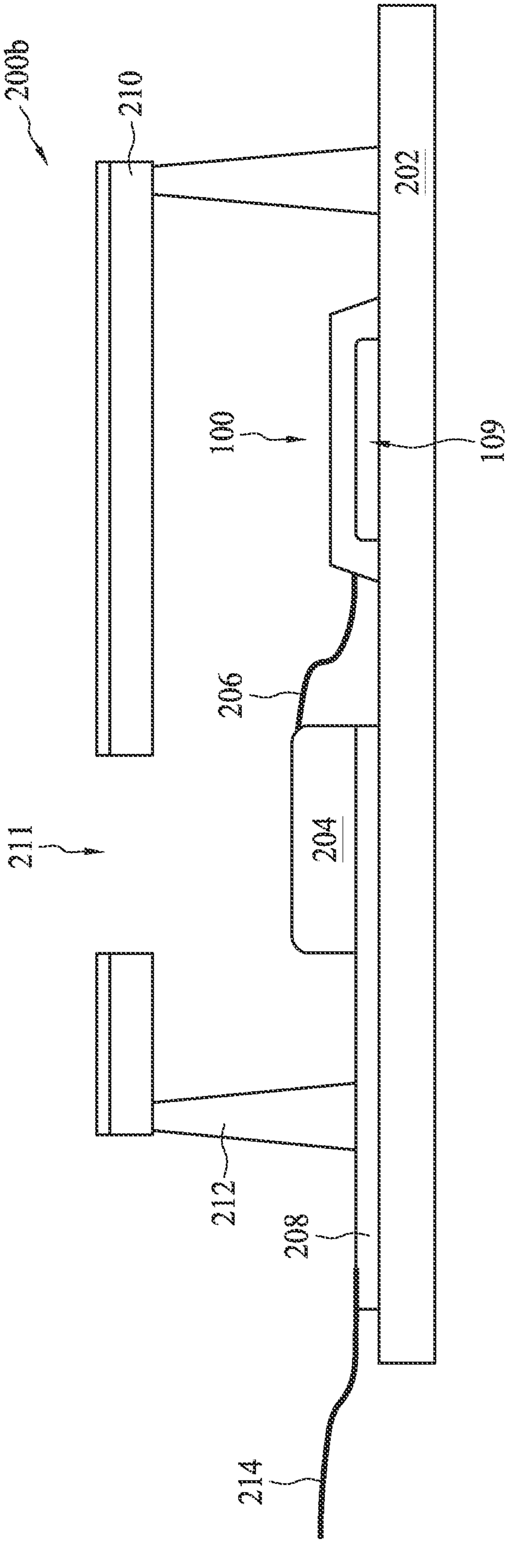
FIG. 8 is a schematic drawing illustrating a sound wave transducer including a piezoelectric-based MEMS microphone in accordance with some embodiments of the present disclosure.

Please refer to FIG. 8, which is a schematic drawing illustrating a sound wave transducer 200*b* in accordance with some embodiments of the present disclosure. It should be understood that same elements in FIGS. 7 and 8 are depicted by same numerals, and repetitive details may be omitted in the interest of brevity. In some embodiments, the piezoelectric-based MEMS microphone 100 is integrated in the sound wave transducer 200*b*. In contrast to the sound wave transducer 200*a*, the sound wave transducer 200*b* has a through hole 211 penetrating the cap or the top cover 210, as shown in FIG. 8.

In some embodiments, the through hole 211 may be offset from the piezoelectric-based MEMS microphone 100, but the disclosure is not limited thereto. For example, the through hole 211 may be aligned with the piezoelectric-based MEMS microphone 100, though not shown. A shape, a location and a dimension of the through hole 211 can be modified according to different product requirements.

In some embodiments, the method 10 may be used to form a capacitive MEMS microphone 300. FIGS. 9A to 18 are schematic views illustrating capacitive MEMS microphones in accordance with some embodiments of the present disclosure. It should be noted that same elements in FIGS. 9A to 18 are depicted by same numerals, and repetitive details may be omitted in the interest of brevity.

Figure 9A:
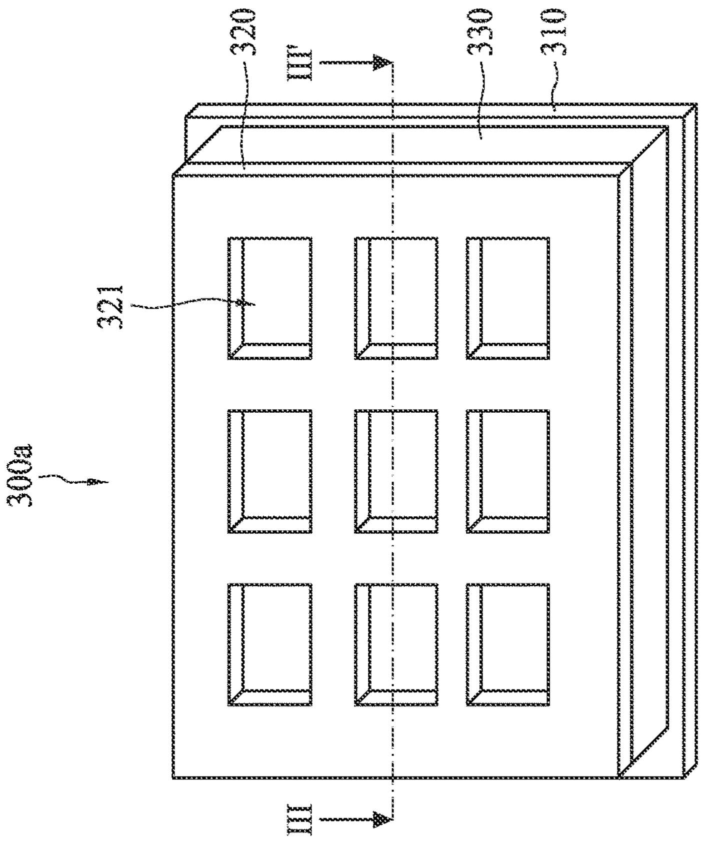
FIG. 9A is a front view of a capacitive MEMS microphone in accordance with some embodiments of the present disclosure.
Figure 9B:
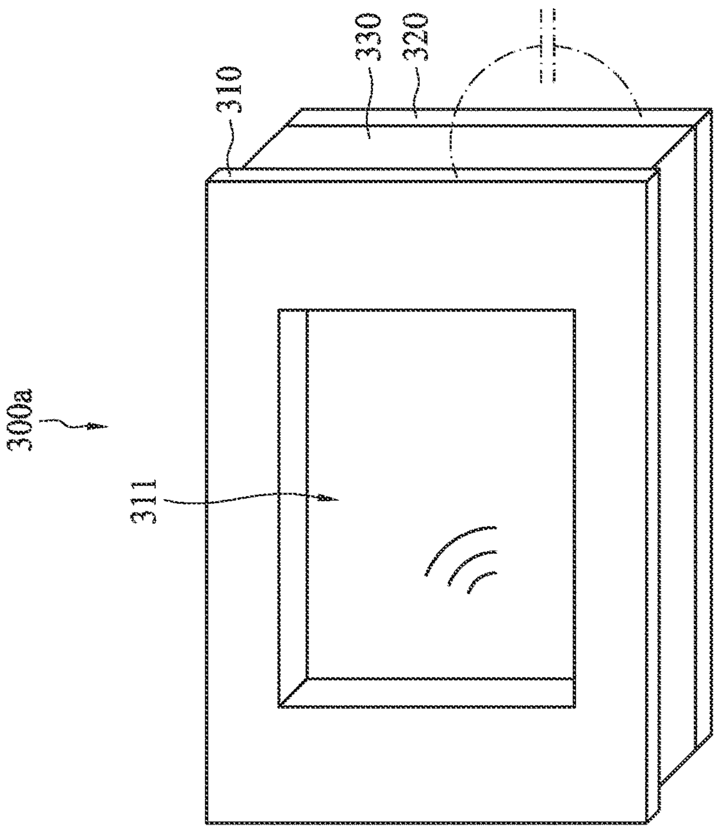
FIG. 9B is a rear view of the capacitive MEMS microphone of FIG. 9A.

Please refer to FIGS. 9A and 9B, which are a front view and a rear view, respectively, of a capacitive MEMS microphone 300*a*. In some embodiments, the capacitive MEMS microphone 300*a* includes a first board 310, a second board 320, and a spacer layer 330 disposed between the first and second boards 310 and 320. The spacer layer 330 adheres the first and second boards 310 and 320 together. In some embodiments, the first board 310 may be referred to as a bottom board, and the second board 320 may be referred to as a top board. Referring to FIG. 9A, in some embodiments, the top board 320 has a plurality of openings 321. In some embodiments, the openings 321 may be arranged to form an array as shown in FIG. 9A, but the disclosure is not limited thereto. It should be noted that shapes, dimensions, quantity and arrangement of the openings 321 may be adjusted or modified according to product requirements.

Referring to FIG. 9B, in some embodiments, the bottom board 320 has an opening 311. A shape, a dimension and a location of the opening 311 may be adjusted or modified according to product requirements.

Figure 10:
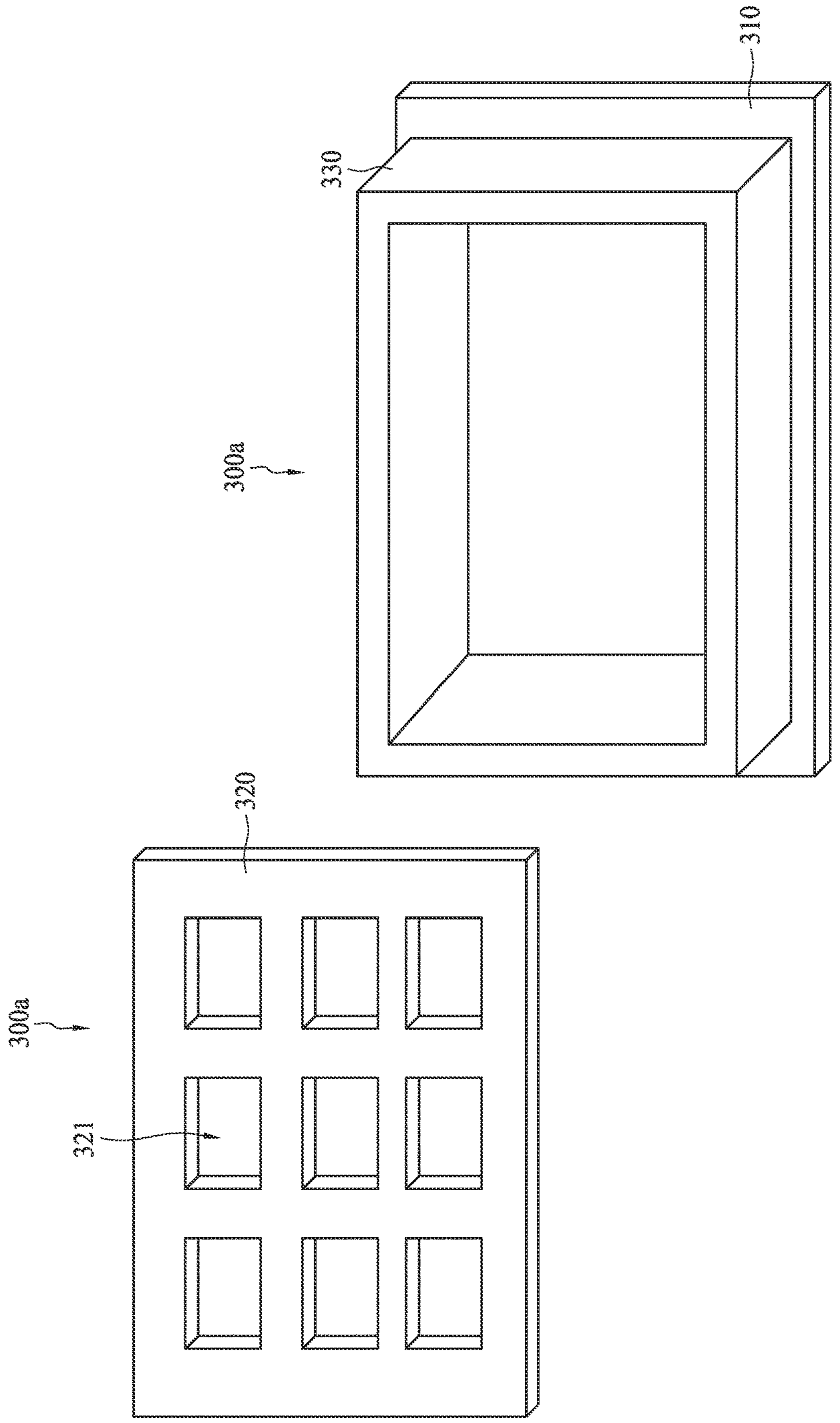
FIG. 10 is a schematic disassembled view of a capacitive MEMS microphone in accordance with some embodiments of the present disclosure.
Figure 11:
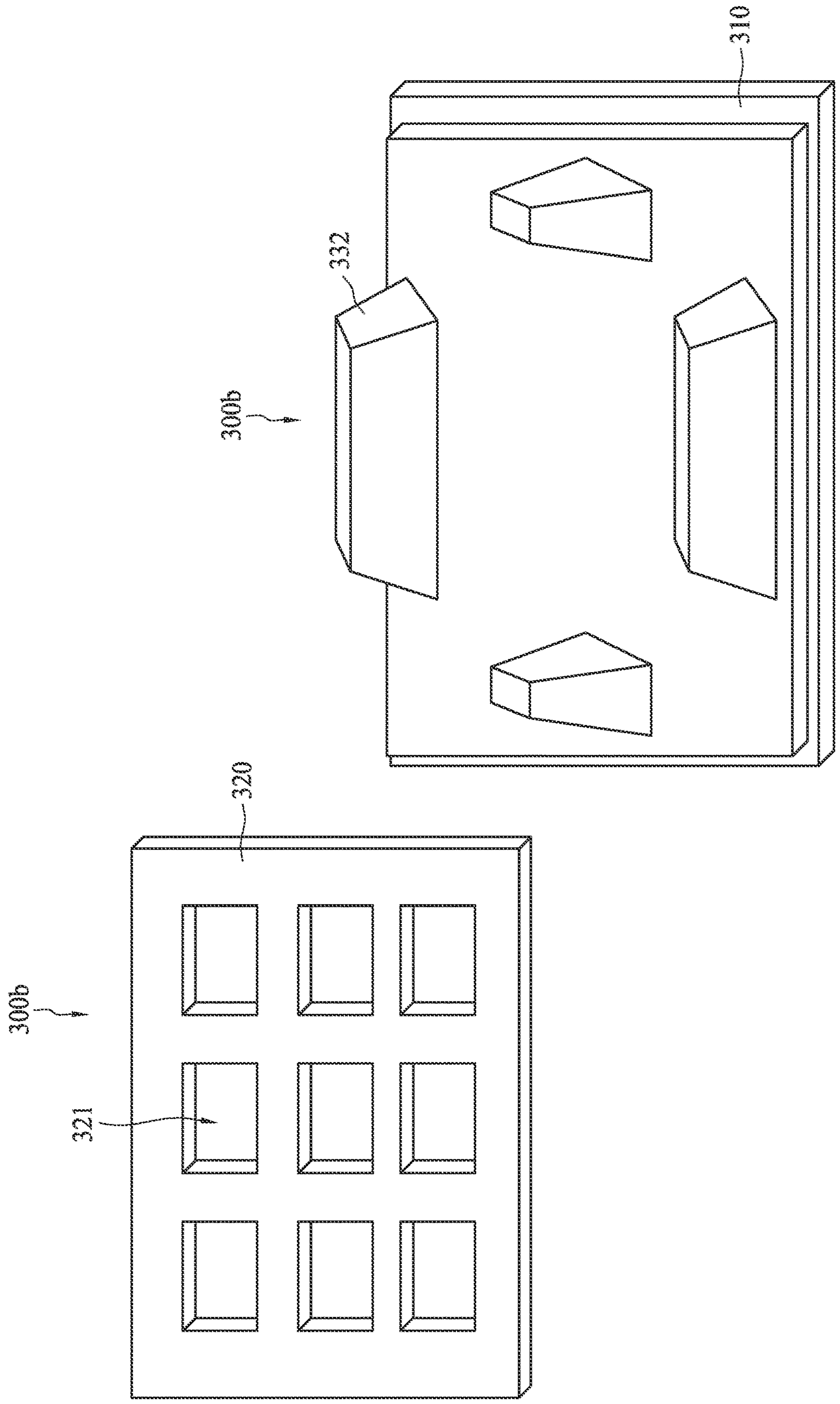
FIG. 11 is a schematic disassembled view of a capacitive MEMS microphone in accordance with some embodiments of the present disclosure.

Please refer to FIGS. 10 and 11, which are disassembled views of the capacitive MEMS microphones 300*a* and 300*b*, respectively. As mentioned above, the capacitive MEMS microphone 300*a* includes the spacer layer 330, and the spacer layer 330 may be an epoxy-based resin. It is preferable that such material allow as little moisture and oxygen as possible to penetrate the spacer layer 330. In some embodiments, the spacer layer 330 may have a closed supporting wall configuration, as shown in FIG. 10. Therefore, a closed contour is formed within the spacer layer 330. In some alternative embodiments, a spacer layer 332 of the capacitive MEMS microphone 300*b* may have a plurality of segmented supporting walls, as shown in FIG. 11. Therefore, an open contour is defined by the spacer layer 332. In such embodiments, a shape and a dimension of each of the segmented supporting walls 332 may be different or similar, depending on different product requirements.

Figure 12:
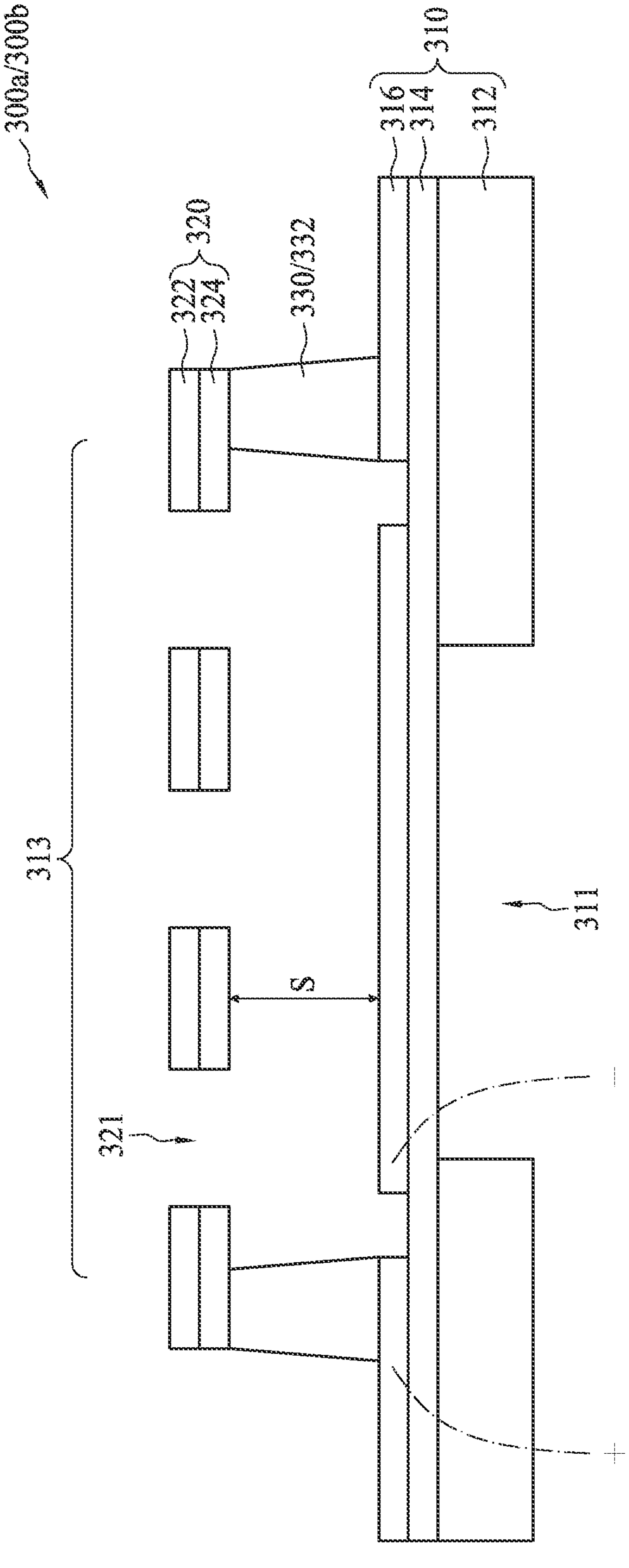
FIG. 12 is a schematic sectional view of a capacitive MEMS microphone in accordance with some embodiments of the present disclosure.

Referring to FIG. 12, in some embodiments, the bottom board 310 includes a carrier 312, a substrate layer 314 and a metal layer 316. The opening 311 is formed to penetrate through the carrier 312. Further, the opening 311 is formed in a central region 313 of the carrier 312. The substrate layer 314 is disposed over the carrier 312. Further, the substrate layer 314 covers the opening 311. Thus, the substrate layer 314 may be exposed through the opening 311 from the rear view. In some embodiments, the carrier 312 may include glass, but the disclosure is not limited thereto. For example, the carrier 312 may include quartz, or a plastic made of FRP, PVF, polyester, acrylic, or the like. In some embodiments, the substrate layer 314 may include polyimide, but the disclosure is not limited thereto.

Still referring to FIG. 12, in some embodiments, the top board 320 includes a substrate layer 322 and a metal layer 324. The openings 321 are formed to penetrate through both the substrate layer 322 and the metal layer 324. The metal layer 324 is disposed on a surface of the substrate layer 322 that is facing the bottom board 310. Thus, the metal layer 316 of the bottom board 310 and the metal layer 324 of the top board 320 serve as two electrodes of a capacitor. In some embodiments, the substrate layer 322 may include polyimide, but the disclosure is not limited thereto.

In some embodiments, the spacer layer 330 or 332 is disposed on the bottom board 310. The spacer layer 330 or 332 is disposed between the metal layer 316 of the bottom board 310 and the metal layer 324 of the top board 320. Thus, it can be said that the metal layer 324 is disposed on the spacer layer 330 or 332. Further, a top surface of the spacer layer 330 or 332 is in contact with the metal layer 324 of the top board 320, while a bottom surface of the spacer layer 330 or 332 is in contact with the metal layer 316 of the bottom board 310. A thickness of the spacer layer 330 or 332 may define a distance S between the top board 320 and the bottom board 310, but the disclosure is not limited thereto. In some embodiments, when the spacer layer 330 has the closed supporting wall configuration, the spacer layer 330 surrounds the central region 313 of the bottom board 310. In other embodiments, when the spacer layer 332 has a segmented supporting wall configuration, the segmented supporting wall are arranged to surround the central region 313 of the bottom board 310.

In some embodiments, the spacer layer 330 includes conductive material, such as anisotropic conductive film (ACF), but the disclosure is not limited thereto. In such embodiments, the metal layer 324 is electrically connected to a voltage source through the spacer layer 330.

Figure 13:
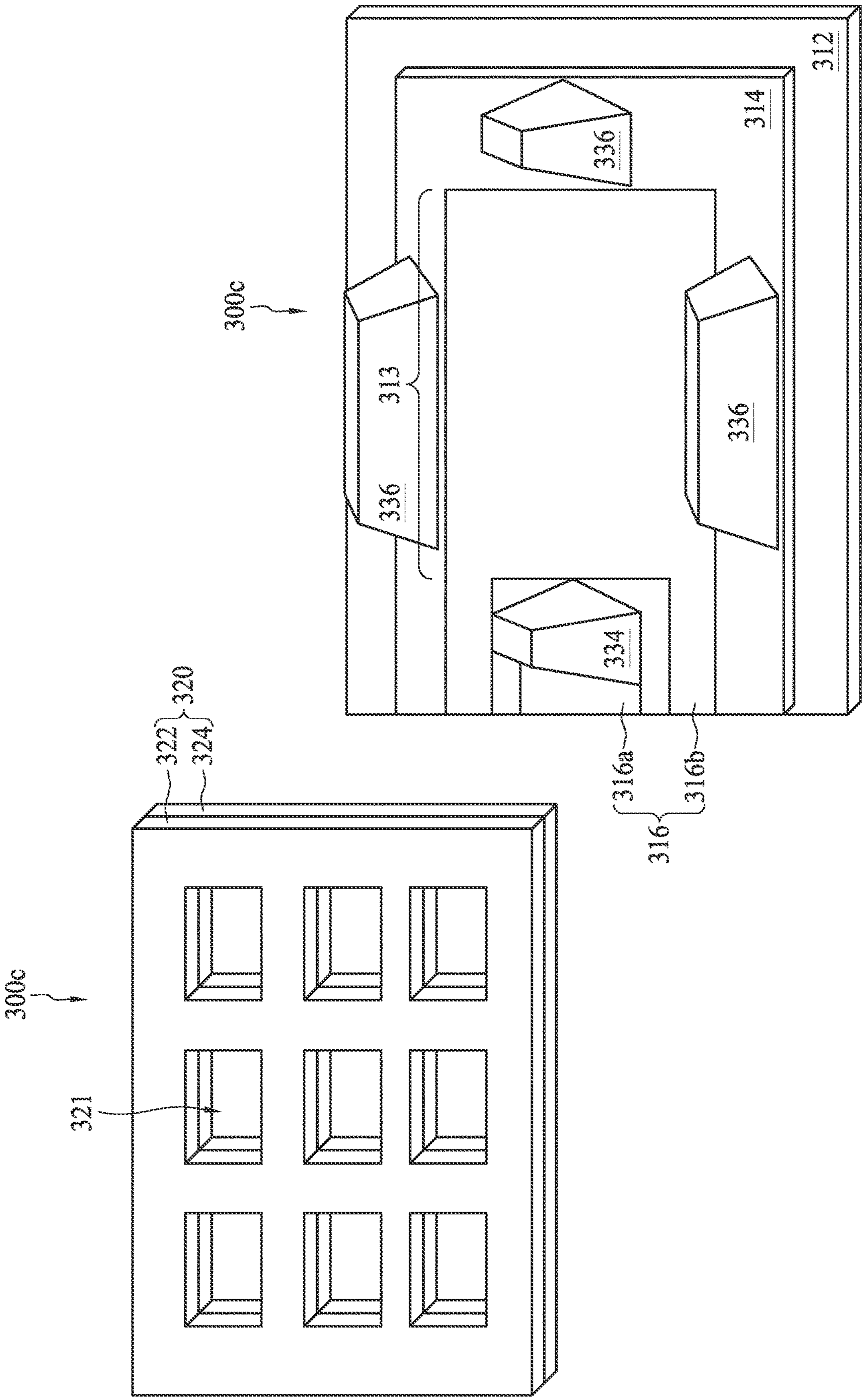
FIG. 13 is a schematic disassembled view of a capacitive MEMS microphone in accordance with some embodiments of the present disclosure.

Please refer to FIG. 13, which is a schematic disassembled view of a capacitive MEMS microphone 300*c* in accordance with some embodiments of the present disclosure. As mentioned above, the spacer layer may have a segmented supporting wall configuration. That is, the spacer layer may include a plurality of segmented supporting walls 334 and 336, and the segmented supporting walls 334 and 336 are arranged to surround the central region 313 of the carrier 312. The segmented supporting walls 334 and 336 may include different materials. For example, some of the segmented supporting walls 336 may include insulating material, and at least one of the segmented supporting walls 334 includes the conductive material. The metal layer 324 of the top board 320 can be electrically connected to the conductive segmented supporting wall 334 and a first trace 316*a*, as shown in FIG. 13. Thus, electrical connection between the metal layer 324 and the voltage source is formed.

In such embodiments, the metal layer 316 is patterned to have the first trace 316*a* and a second trace 316*b*. The first trace 316*a* is physically and electrically isolated from the second trace 316*b*. In such embodiments, the second trace 316*b* further includes a sensing portion covering the central region 313 and serving as the electrode of the capacitor, and a connecting portion providing electrical connection between the sensing portion and a voltage source. The first trace 316*a* serves as a wiring line electrically connected to the metal layer 324 of the top board 320 through the conductive segmented supporting walls 334. Thus, the metal layer 324 of the top board 320 is electrically connected to the voltage source through the conductive segmented supporting walls 334. Therefore, the metal layer 324 of the top board 320 and the metal layer 316 (i.e., the sensing portion of the second trace 316*b*) of the bottom board 310 serve as two electrodes of a capacitor.

Figure 14:
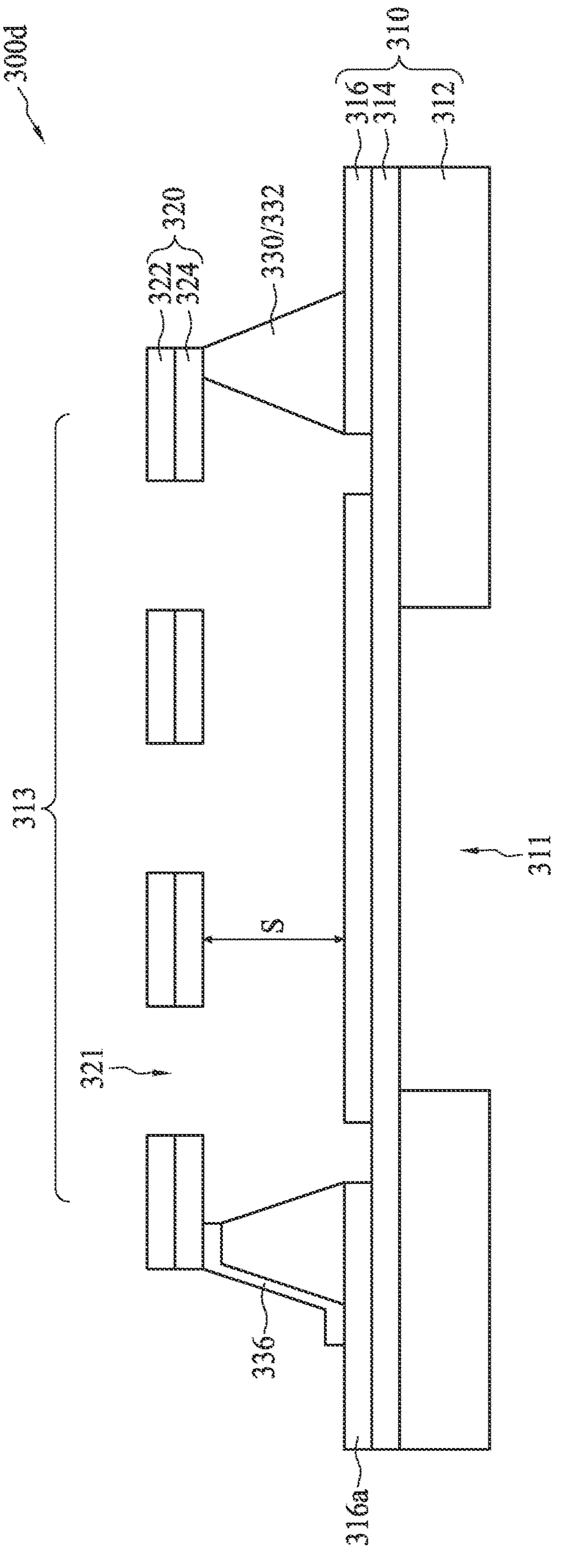
FIG. 14 is a schematic sectional view of a capacitive MEMS microphone in accordance with some embodiments of the present disclosure.

Referring to FIG. 14, in some embodiments, the spacer layer 330 or 332 of a capacitive MEMS microphone 300*d* may include insulating material. A conductive glue layer 336 is provided to provide adhesion and electrical connection between the spacer layer 330 or 332 and the metal layer 324 of the top board 320. In such embodiments, a top surface and sidewalls of the spacer layer 330 or 332 are made rather flat so that the conductive glue layer 336 can be disposed smoothly along the spacer layer 330 or 332. Accordingly, the metal layer 324 is electrically connected to the voltage source through the conductive glue layer 336 and the first trace 316*a* of the metal layer 316, thus allowing the metal layer 324 to serve as the electrode of the capacitor.

Figure 15:
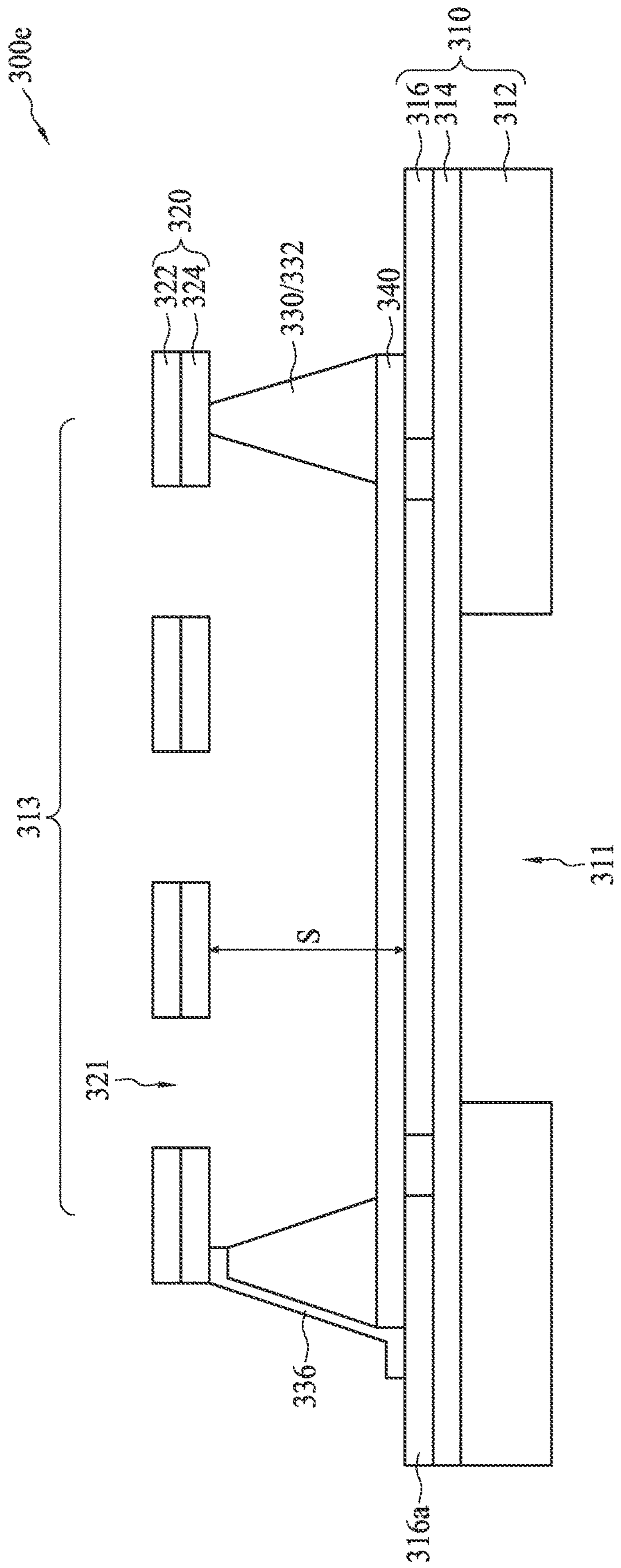
FIG. 15 is a schematic sectional view of a capacitive MEMS microphone in accordance with some embodiments of the present disclosure.

Referring to FIG. 15, in some embodiments, a capacitive MEMS microphone 300*e* further includes a buffer layer 340 disposed on the metal layer 316. In other words, the buffer layer 340 is disposed between the metal layer 316 and the spacer layer 330 or 332. The buffer layer 340 may include semiconductor material, such as silicon, amorphous silicon, etc. In such embodiments, the buffer layer 340 allows the metal layer 316 of the bottom board 310 to have a more flexible pattern. Further, a thickness of the buffer layer 340 helps to adjust the distance S between the two electrodes (i.e., the metal layer 324 and the metal layer 316), and materials used to form the buffer layer 340 may provide different dielectric constants. Thus, characteristics of the capacitor may be modified by the thickness and the material of the buffer layer 340. The buffer layer 340 further helps to change a damping characteristic of the metal layer 316 of the bottom board 310. Accordingly, a frequency response of the capacitive MEMS microphone 300*e* can be changed.

Figure 16:
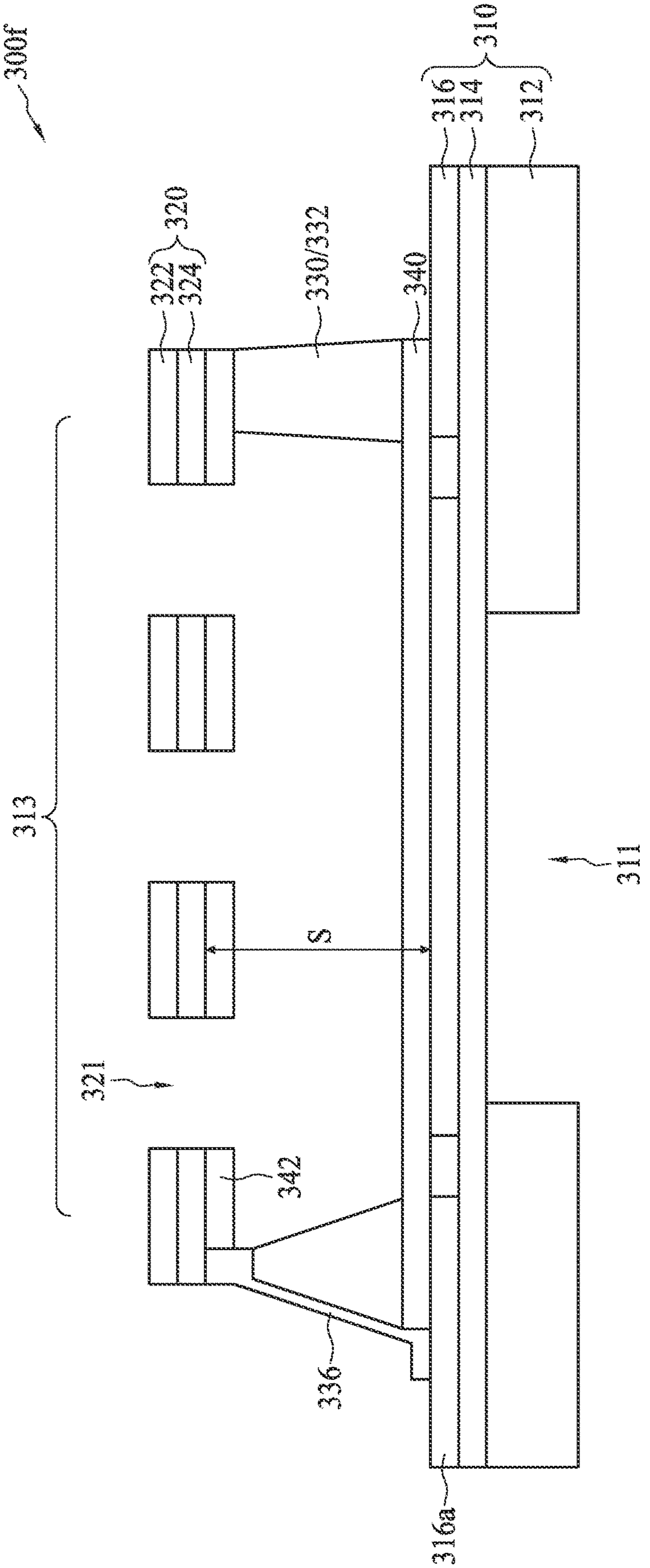
FIG. 16 is a schematic sectional view of a capacitive MEMS microphone in accordance with some embodiments of the present disclosure.

Referring to FIG. 16, in some embodiments, a capacitive MEMS microphone 300*f* further includes another buffer layer 342 disposed on the metal layer 324. In other words, the metal layer 324 is disposed between the buffer layer 342 and the substrate layer 322. Further, the spacer layer 330 is disposed between the buffer layer 340 and the buffer layer 342. The buffer layer 342 may include semiconductor material, such as silicon, amorphous silicon, etc. Additionally, the buffer layers 340 and 342 may include a same material. In some alternative embodiments, the buffer layers 340 and 342 may include different materials. In such embodiments, a thickness of the buffer layer 342 helps to adjust a distance between the two electrodes (i.e., the metal layer 324 and the metal layer 316), and materials used to form the buffer layer 342 may provide different dielectric constants. Thus, characteristics of the capacitor may be modified by the thickness and the material of the buffer layer 342. As mentioned above, the buffer layer 342 further helps to change a damping characteristic of the metal layer 324 of the top board 320. Accordingly, a frequency response of the capacitive MEMS microphone 300*f* can be changed.

Figure 17:
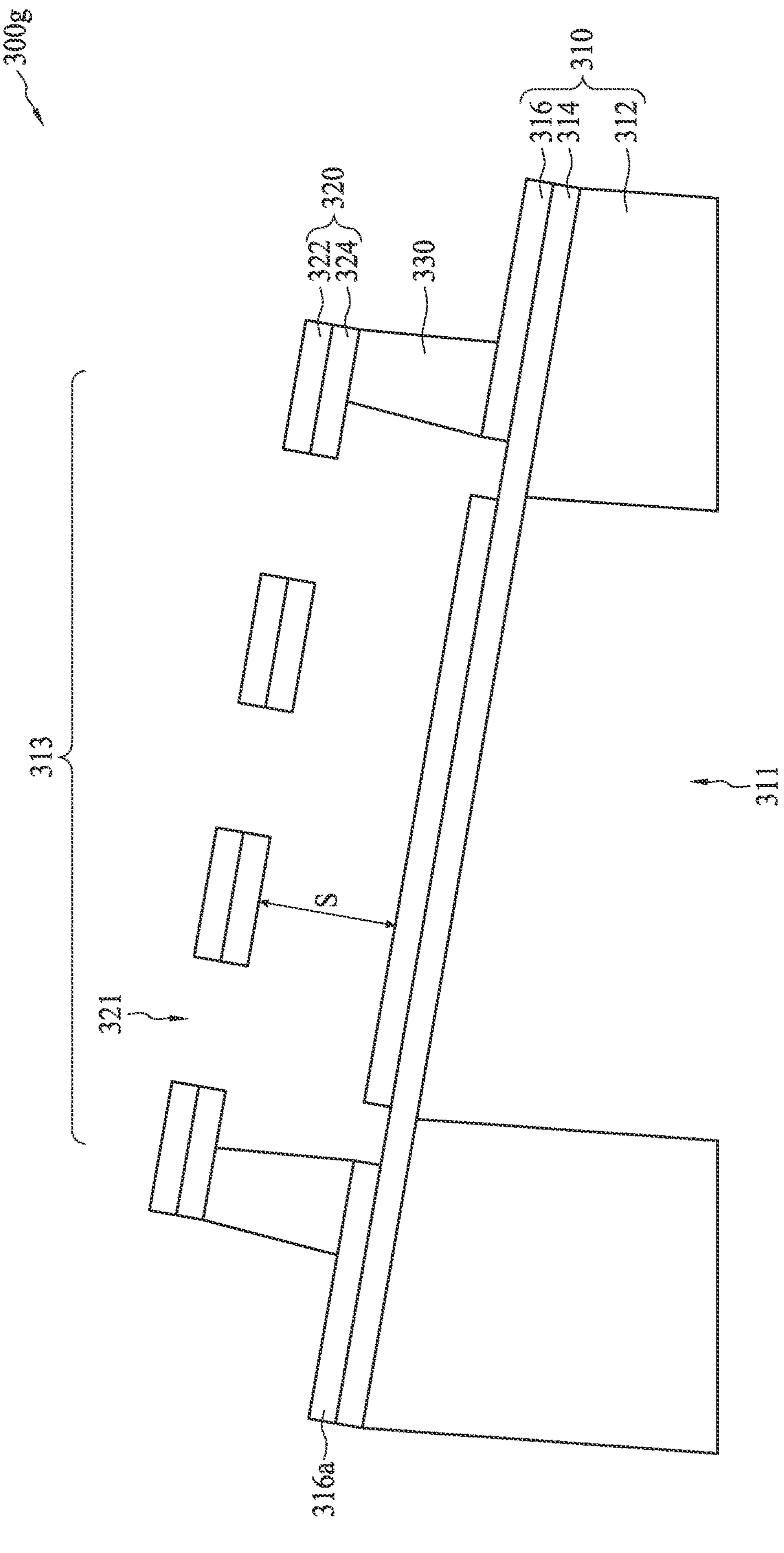
FIG. 17 is a schematic sectional view of a capacitive MEMS microphone in accordance with some embodiments of the present disclosure.

Referring to FIG. 17, in some embodiments, the carrier 312 of the bottom board 310 may have a gradient thickness. In such embodiments, the top board 320 and the bottom board 310 are parallel with each other. Accordingly, a capacitive MEMS microphone 300*g* may have an inclined sound-receiving surface due to the gradient thickness of the carrier 312 of the bottom board 310. In such embodiments, a directional microphone is provided. The directional capacitive MEMS microphone 300*g* may have greater sensitivity for sound waves coming from a specific direction and less sensitivity for sound waves coming from other direction.

Figure 18:
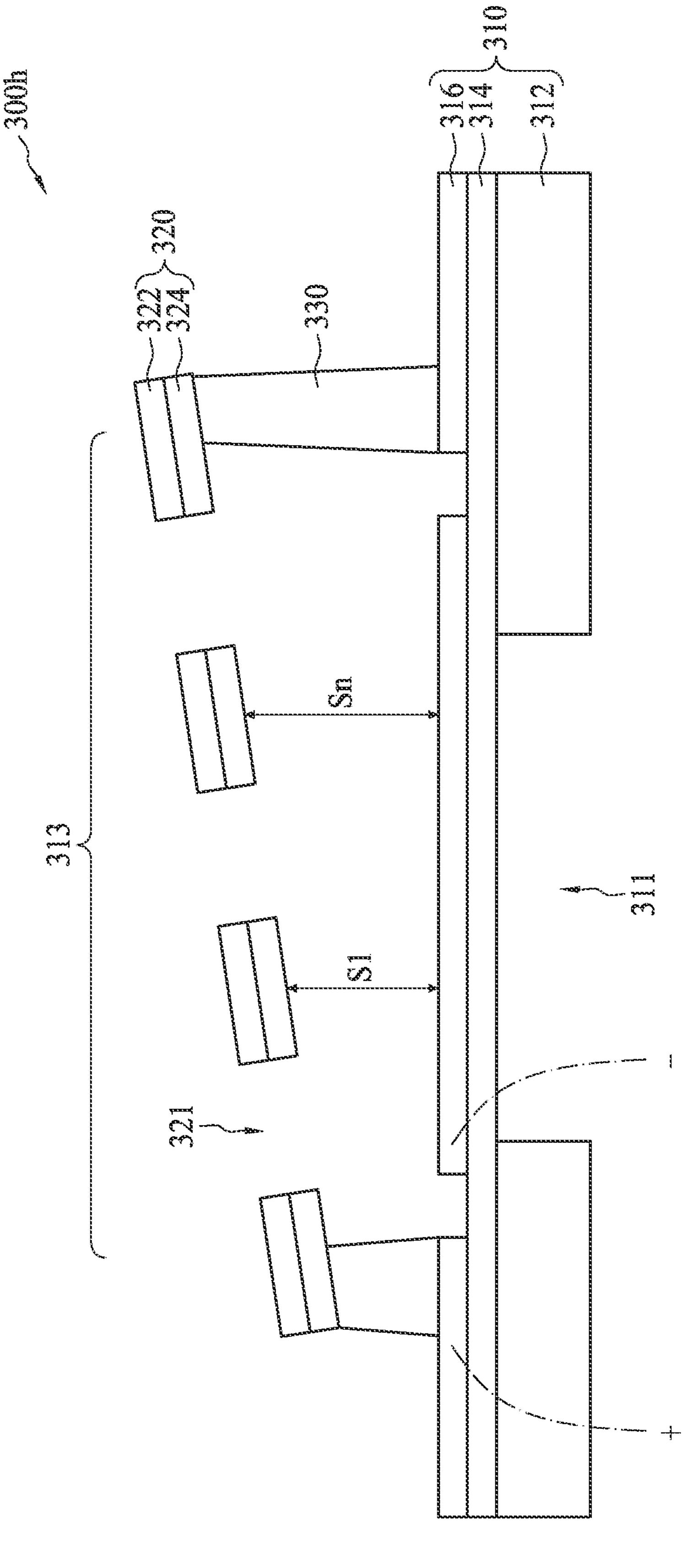
FIG. 18 is a schematic sectional view of a capacitive MEMS microphone in accordance with some embodiments of the present disclosure.

Referring to FIG. 18, in some embodiments, the spacer layer 330 may have an inconsistent thickness. Thus, the top board 320 is not parallel to the bottom board 310. Thus, a spacing distance between the metal layer 324 and the metal layer 316 is inconsistent. As shown in FIG. 18, a plurality of spacing distances S1, S2, and Sn are obtained. In such embodiments, a capacitive MEMS microphone 300*h* may have an inclined sound-receiving surface due to the inconsistent thickness of the spacer layer 330, and thus a directional microphone is provided. As mentioned above, the directional capacitive MEMS microphone 300*h* may have greater sensitivity for sound waves coming from a specific direction and less sensitivity for sound waves coming from other direction.

According to the capacitive MEMS microphones 300*a* to 300*h* described above, the spacing distance S (and S1 and S2 to Sn) changes as the sound wave causes the metal layer 316 of the bottom board 310 over the opening 311 to move or vibrate. When the spacing distance S changes, capacitance of the capacitor changes and thus signal is generated. With different configurations of the spacer layers 330 and 332 (as shown in FIGS. 9A and 9B to 12) and various material selections for the spacer layer 334 and 336 (as shown in FIGS. 13 and 14), different electrical connections between the metal layers 316 and 324 can be easily made. By adding the buffer layers 340 and 342 (as shown in FIGS. 15 and 16), characteristics of the capacitor may be easily modified. By using the carrier 312 with the gradient thickness (as shown in FIG. 17) or using the spacer layer 330 having different thicknesses (as shown in FIG. 18), a directional microphone may be obtained. Further, the abovementioned capacitive MEMS microphones 300*a* to 300*h* can be integrated with each other, depending on product requirements, and thus flexibility of product design is improved.

Please refer to FIGS. 19A and 19B to 21, which are schematic drawings illustrating a sound wave transducer 400*a* to 400*c* in accordance with some embodiments of the present disclosure. It should be understood that same elements in FIGS. 19A and 19B to 21 are depicted by same numerals, and repetitive details may be omitted in the interest of brevity.

In some embodiments, a capacitive MEMS microphone 300 (i.e., the capacitive MEMS microphones 300*a* to 300*h*) may be integrated in a sound wave transducer 400*a*. In some embodiments, the carrier 312 of the bottom board 310 of the capacitive MEMS microphone 300 serves as a substrate 402 for the sound wave transducer 400*a*, as shown in FIG. 19A.

The capacitive MEMS microphone 300 is electrically connected to a chip 404 through the first trace 316*a* of the metal layer 316 of the bottom board 310, but the disclosure is not limited thereto. In some embodiments, the chip 404 may be a signal processing unit or an ASIC, but the disclosure is not limited thereto. The ASIC 404 may be used to process voltage signals generated from the MEMS microphone 300, to perform filtering operations and amplifying operations. Accordingly, the voltage signals derived from the MEMS microphones 300 are interpreted.

A cap or a top cover 406 is disposed over the substrate 402 and fixed to the substrate 402 by a sealant 408. In some embodiments, the sealant 408 may be disposed on the substrate layer 314 of the bottom board 310, as shown in FIG. 19A, but the disclosure is not limited thereto. In other embodiments, the sealant 408 may be disposed on the metal layer 316 of the bottom board 310, though not shown. In some embodiments, the sealant 408 may be an epoxy-based resin. In some alternative embodiments, the sealant 408 may include conductive materials. It is preferable that such material allow as little moisture and oxygen as possible to penetrate the sealant 408. Further, a thickness of the sealant 408 may define a distance between the top cover 406 and the carrier 312, but the disclosure is not limited thereto. In some embodiments, the ASIC 404 and portions of the capacitive MEMS microphone 300 (i.e., the metal layer 316, the spacer layer 330/332, and the top board 320) are disposed within a region defined by the sealant 408, as shown in FIGS. 19A and 19B. In other words, the sealant 408 surrounds the metal layer 316 of the bottom board 310, the spacer layer 330 or 332, the top board 320 and the ASIC 404.

Figure 19A:
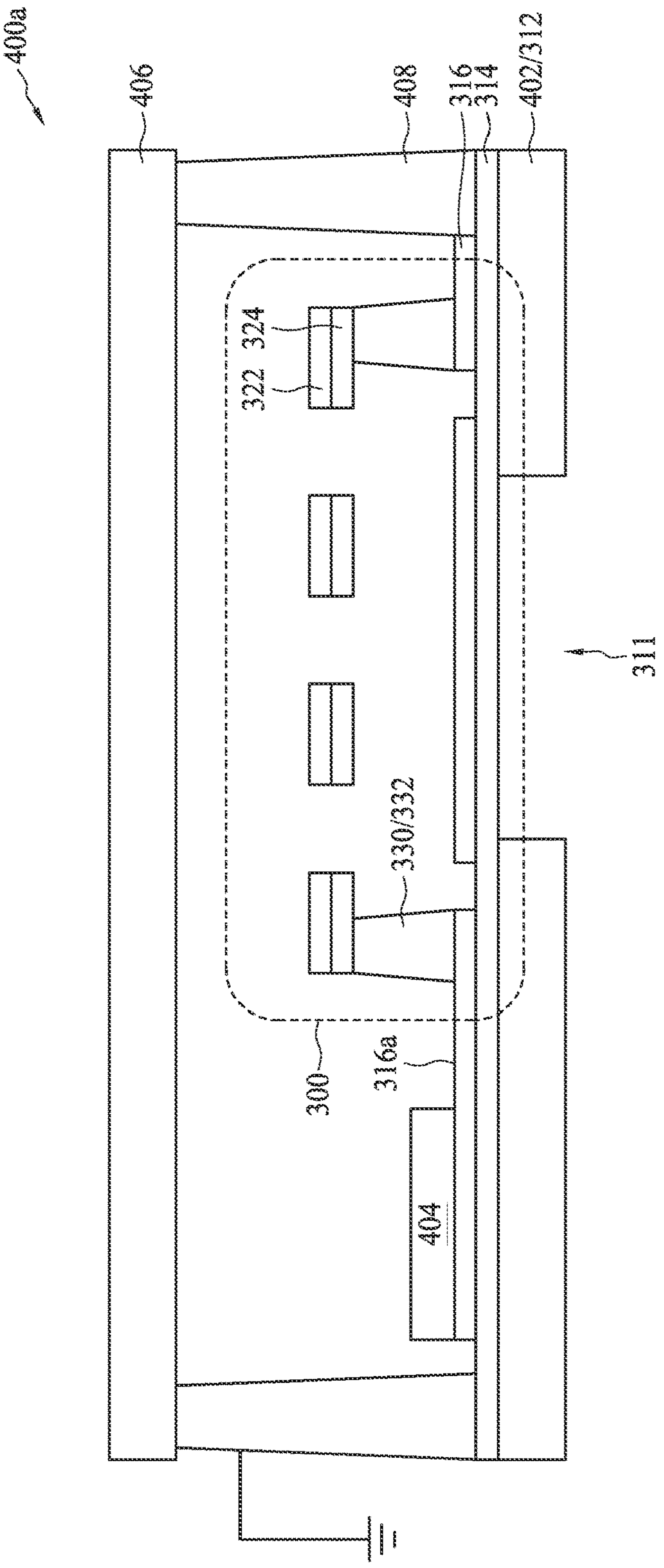
FIG. 19A is a schematic drawing illustrating a sound wave transducer including a capacitive MEMS microphone in accordance with some embodiments of the present disclosure.
Figure 19B:
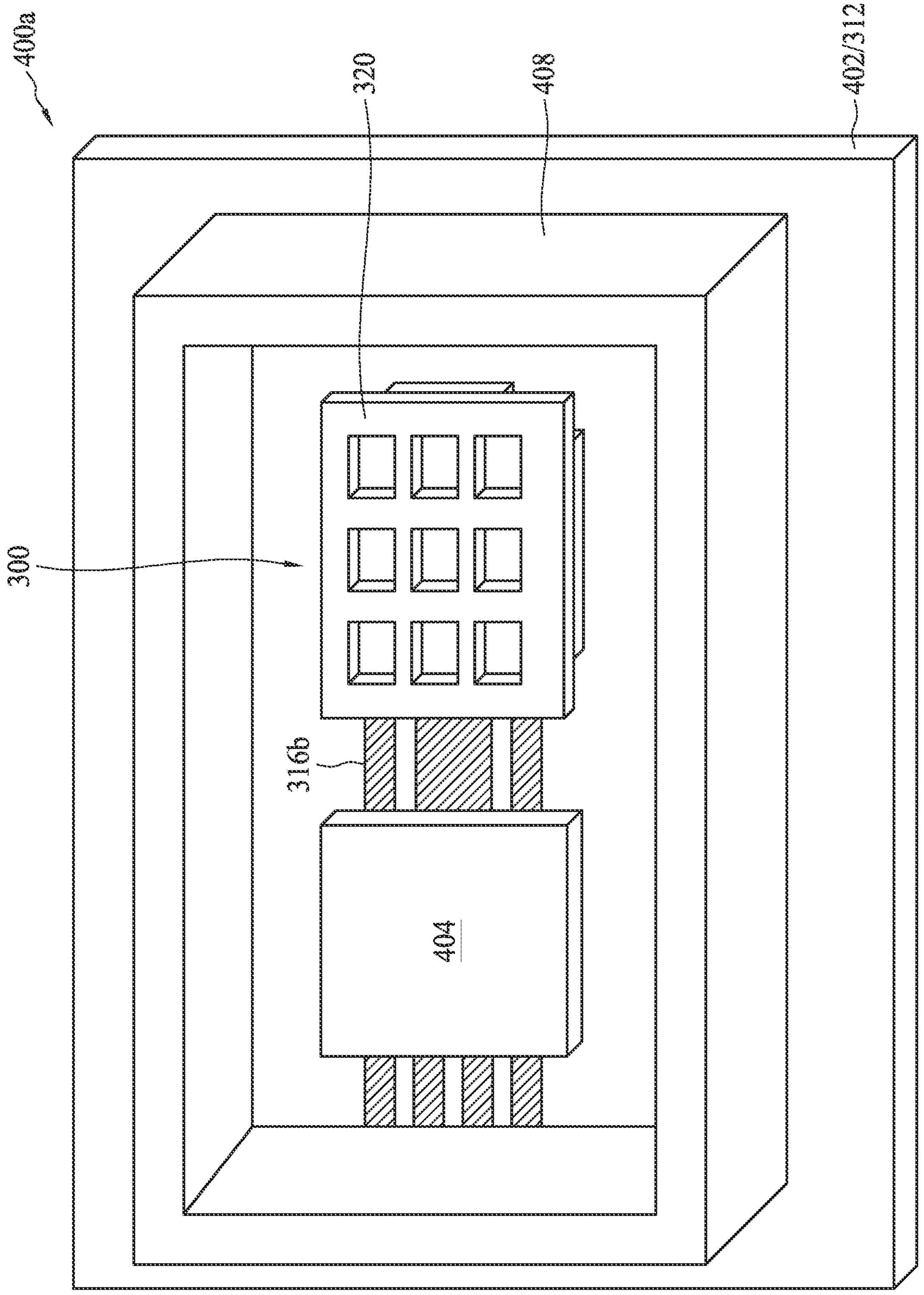
FIG. 19B is a top view of the sound wave transducer of FIG. 19A.

Still referring to FIG. 19A, in some embodiments, when the sealant 408 includes conductive materials, the sealant 408 provides protection from external interference. In such embodiments, the conductive sealant 408 may be grounded, but the disclosure is not limited thereto.

Figure 20:
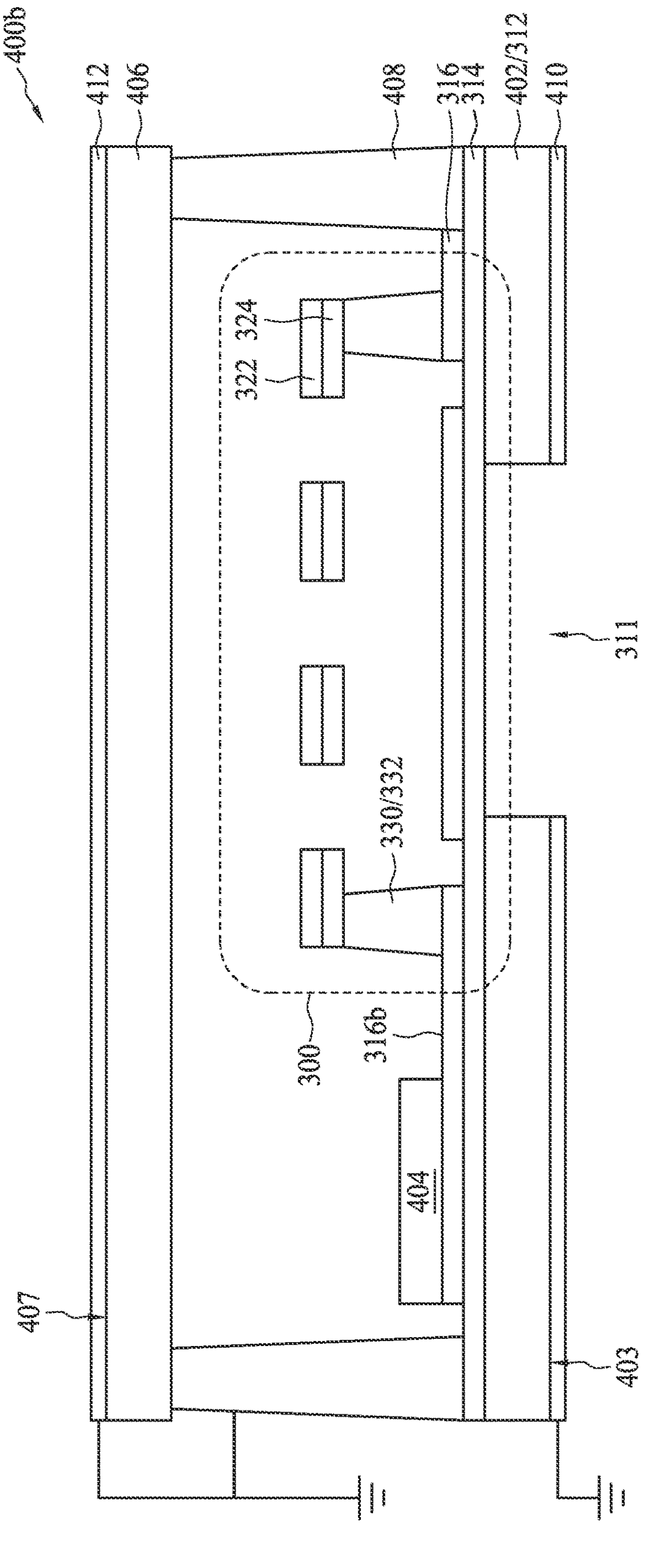
FIG. 20 is a schematic drawing illustrating a sound wave transducer including a MEMS microphone in accordance with some embodiments of the present disclosure.

Referring to FIG. 20, in some embodiments, a sound wave transducer 400*b* may include a conductive layer 410 disposed over an external surface 403 of the substrate 402, and a conductive layer 412 disposed over an external surface 407 of the top cover 406. The conductive layers 410 and 412 provide protection from external interference. In such embodiments, the conductive sealant 408 and the conductive layers 410 and 412 may be grounded, but the disclosure is not limited thereto.

Figure 21:
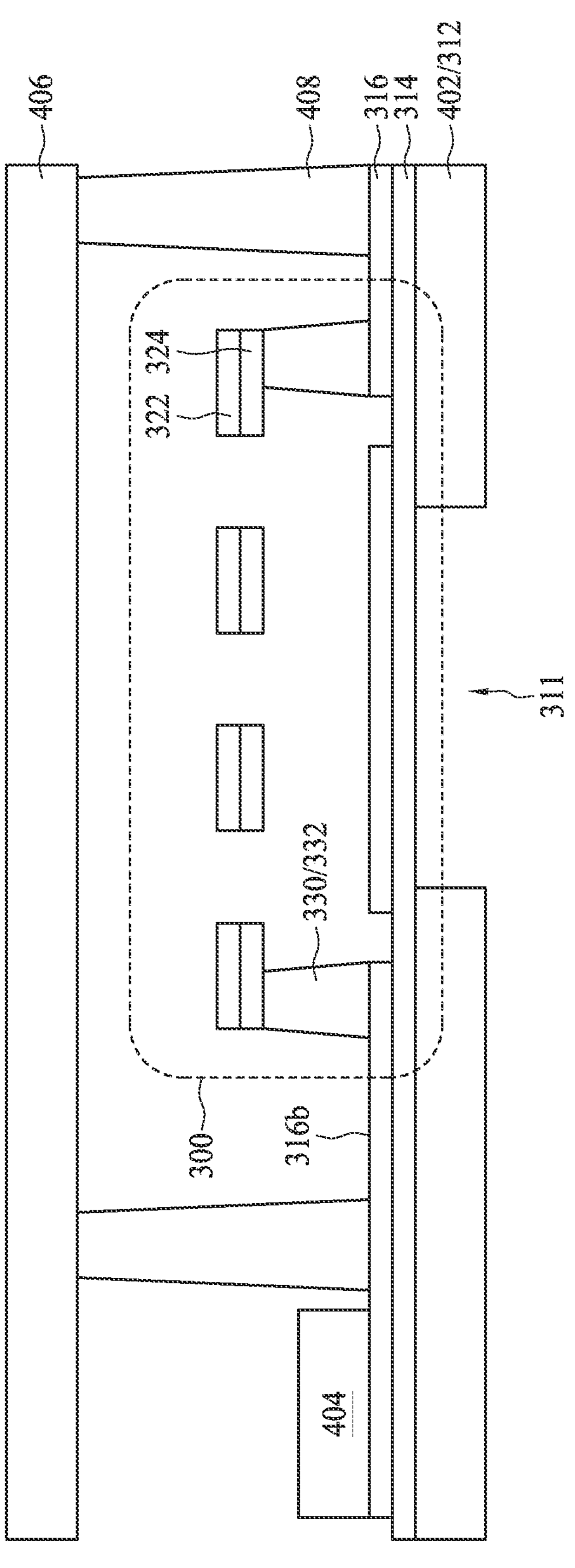
FIG. 21 is a schematic drawing illustrating a sound wave transducer including a MEMS microphone in accordance with some embodiments of the present disclosure.

Referring to FIG. 21, in some embodiments, the sound wave transducer 400*c* may have the capacitive MEMS microphone 300 disposed within a region surrounded by the sealant 408, while the ASIC 404 is disposed outside the region. In other words, the sealant 408 surrounds the spacer layer 330 or 332 and the top board 320. In such embodiments, the ASIC 404 and the MEMS microphone 300 can be electrically connected by the metal layer 316 of the bottom board 310. In other embodiments, the electrical connection between the MEMS microphone 300 and the ASIC 404 may be provided by an ACF, but the disclosure is not limited thereto.

Figure 22:
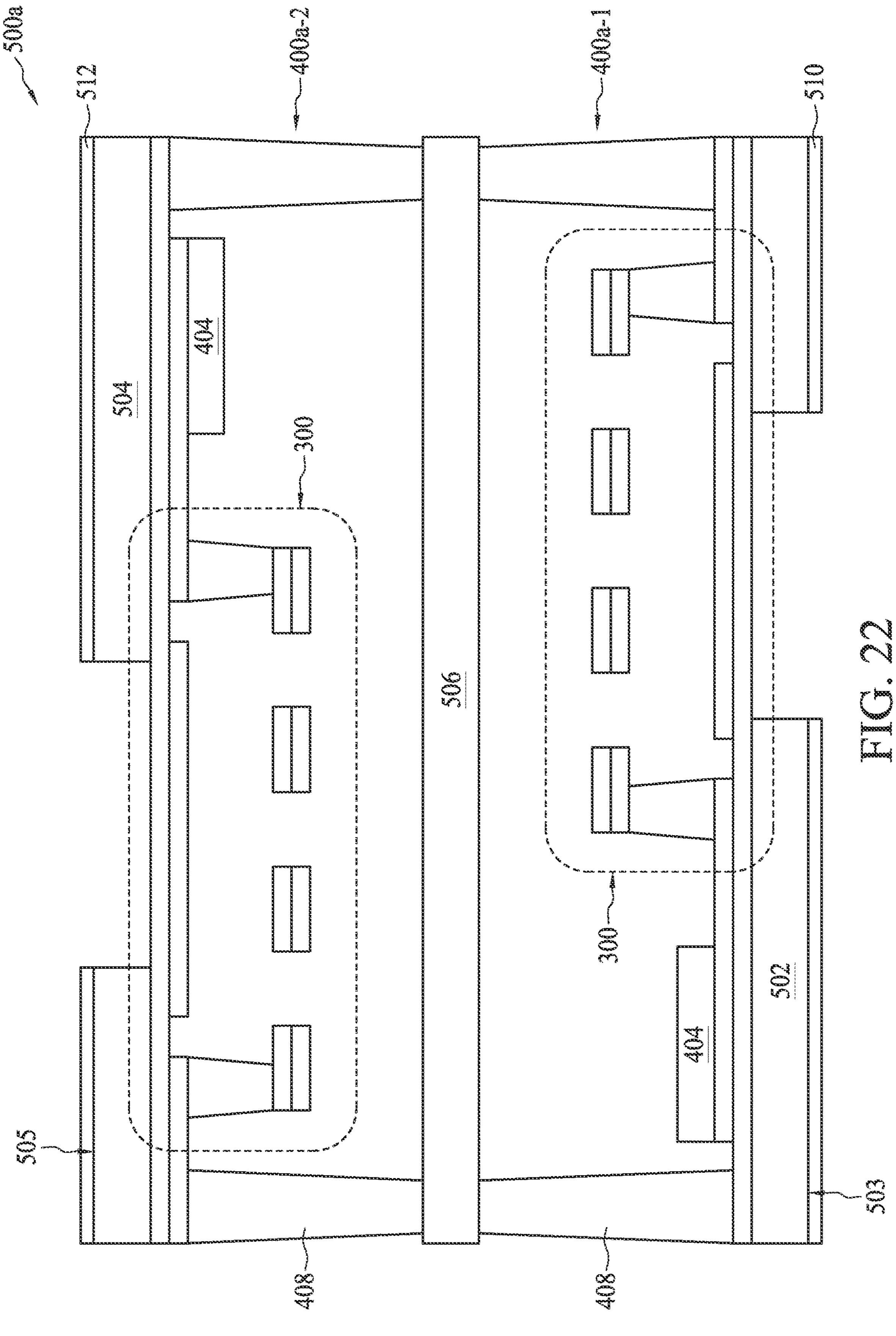
FIG. 22 is a schematic drawing illustrating a sound wave transducer module in accordance with some embodiments of the present disclosure.

Referring to FIG. 22, in some embodiments, the sound wave transducers 400*a*, 400*b* and/or 400*c* may be integrated to form a sound wave transducer module 500*a*. It should be noted that each of the sound wave transducers 400*a*, 400*b* and 400*c* may include at least a MEMS microphone 300 (i.e., the capacitive MEMS microphone 300*a* to 300*h*) or 100 (i.e., the piezoelectric-based MEMS microphone 100*a* to 100*d*, though not shown), depending on different product requirements.

For example, the sound wave transducer module 500*a* includes two sound wave transducers 400*a*-1 and 400*a*-2 vertically stacked and integrated. In some embodiments, the carrier 312 of the bottom board 310 of a lower sound wave transducer 400*a*-1 may serve as a bottom substrate 502 of the sound wave transducer module 500*a*, and the carrier 312 of the bottom board 310 of an upper sound wave transducer 400*a*-2 may serve as a top substrate 504 of the sound wave transducer module 500*a*. Further, the two sound wave transducers 400*a*-1 and 400*a*-2 may share one top cover, which serves as a middle spacer 506 between the two MEMS microphones 300. That is, the two sound wave transducers 400*a*-1 and 400*a*-2 are integrated in a face-to-face manner. In such embodiments, the opening 311 of the lower sound wave transducer 400*a*-1 and the opening 311 of the upper sound wave transducer 400*a*-2 face opposite directions. Accordingly, the MEMS microphones 300 of the two sound wave transducers 400*a*-1 and 400*a*-2 may be used to detect sound waves from opposite directions. Thus, practicality of the sound wave transducer module 500*a* is further improved.

Additionally, although in some embodiments, each of the two MEMS microphones 300 is independently operated by its own ASIC 404, in other embodiments, the two MEMS microphones 300 share one ASIC 404, and are both operated by the one ASIC 404.

Still referring to FIG. 22, in some embodiments, conductive layers 510 and 512 are formed over external surfaces of the sound wave transducer module 500*a*. For example, the conductive layer 510 may be disposed over an external surface 503 of the bottom substrate 502 (i.e., the carrier 312 of the bottom board 310 of the lower sound wave transducer 400*a*-1), and the conductive layer 512 may be disposed over an external surface 505 of the bottom substrate 504 (i.e., the carrier 312 of the bottom board 310 of the upper sound wave transducer 400*a*-2). As mentioned above, the conductive layers 510 and 512 may provide protection from external interference.

Further, in some embodiments, the sealants 408 of both the upper and lower sound wave transducers 400*a*-1 and 400*a*-2 may include conductive materials. Thus, the conductive sealants 408 also provides protection from external interference.

Figure 23:
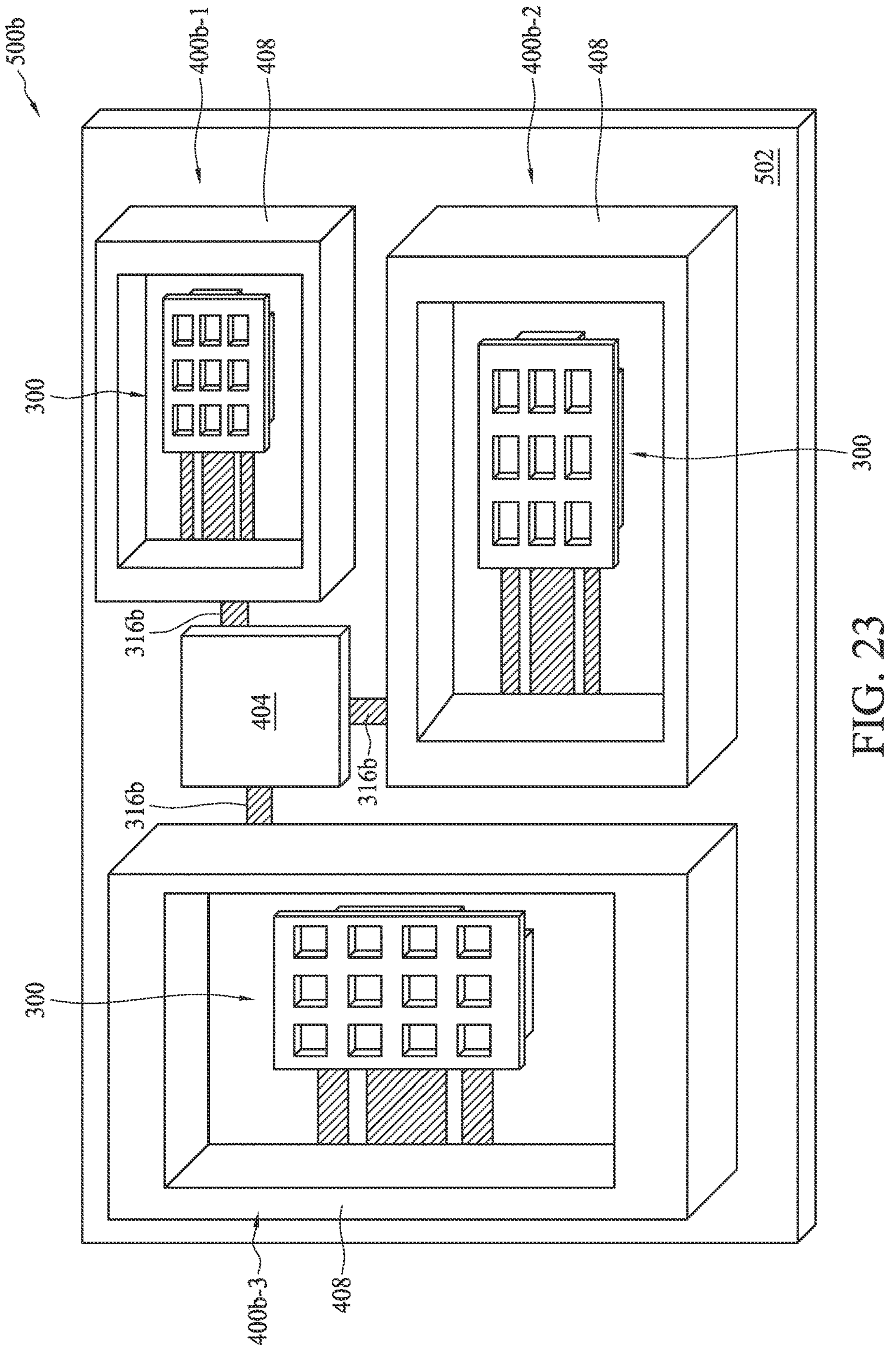
FIG. 23 is a top view of a sound wave transducer module in accordance with some embodiments of the present disclosure.

Referring to FIG. 23, a sound wave transducer module 500*b* includes more than two sound wave transducers integrated together. In some embodiments, the sound wave transducer module 500*b* may include the sound wave transducers 400*a* laterally integrated, but the disclosure is not limited thereto. For example, the sound wave transducer module 500*b* may include a plurality of sound wave transducers 400*b*-1, 400*b*-2 and 400*b*-3 laterally integrated, as shown in FIG. 23.

In such embodiments, all of the sound wave transducers 400*b*-1 to 400*b*-3 may share one carrier of the bottom board, which serves as a bottom substrate 502 of the sound wave transducer module 500*b*. Further, all of the sound wave transducers 400*b*-1 to 400*b*-3 may share one top cover, though not shown in FIG. 23. However, each of the MEMS microphones 300 (i.e., the capacitive MEMS microphone 300*a* to 300*h*) or 100 (i.e., the piezoelectric-based MEMS microphone 100*a* to 100*d*, though not shown) are separated from each other by the sealants 408.

In such embodiments, the MEMS microphones 300 or 100 may share one ASIC 404. That is, the MEMS microphones 300 or 100 are electrically connected to a same ASIC 404 through the first trace 316*a* of the metal layer 316. However, in other embodiments, ACF may be used to provide the electrical connections between the ASIC 404 and the MEMS microphones 300 or 100. In such embodiments, only one ASIC 404 is used to process the voltage signals generated from the MEMS microphone 300, to perform filtering operations and amplifying operations. Accordingly, the voltage signals derived from the MEMS microphones 300 are interpreted.

Additionally, although the MEMS microphones 300 in some embodiments share one ASIC 404 and are operated by the one ASIC 404, in other embodiments, each of the MEMS microphones 300 may be independently operated by its own ASIC.

The sound wave transducer module 500*b* may have the MEMS microphone 300 or 100 of various sizes so as to provide the desired frequency responses. In other words, the sound wave transducer module 500*b* may be used to detect sound waves of various frequencies. Thus, practicality of the sound wave transducer module 500*b* is further improved.

As mentioned above, conductive layers may be formed over external surfaces of the top and bottom substrates of the sound wave transducer module 500*b* for providing protection from external interference. The sealants 408 may include conductive materials, and the conductive sealants 408 may also be used for protection from external interference.

According to the present disclosure, various piezoelectric-based MEMS microphones and various capacitive MEMS microphones are provided. The piezoelectric-based MEMS microphones and the capacitive MEMS microphones may be manufactured by TFT manufacturing operations. Therefore, a dimension of the piezoelectric-based MEMS microphones and the capacitive MEMS microphones can be reduced to less than approximately 50 millimeters. In some embodiments, the dimensions of the piezoelectric-based MEMS microphones and the capacitive MEMS microphones can be reduced to between approximately 20 micrometers and approximately 50 millimeters, but the disclosure is not limited thereto. Further, the various MEMS microphones can be integrated with ASICs to form sound wave transducer, and the sound wave transducers can be integrated to form a transducer module. By selecting various MEMS microphones and various sound wave transducers, various transducer modules for different product requirements can be provided. Accordingly, a practicality and design flexibility of the sound wave transducers are improved.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A sound wave transducer, comprising:
a first board comprising:
a carrier having a first opening formed in a central region of the carrier;
a first substrate layer disposed on the carrier and over the first opening; and
a first metal layer disposed on the first substrate layer, wherein the first metal layer comprises a first metal trace and a second metal trace;
a spacer layer disposed on the first board and surrounding the central region, wherein the spacer layer comprises at least a supporting wall, the first metal trace is in contact with the supporting wall, and the second metal trace covers the central region and is insulated from the first metal trace; and
a second board over the first board and the spacer layer, and comprising:
a second substrate layer;
a second metal layer disposed on the spacer layer; and
a plurality of second openings penetrating through the second substrate layer and the second metal layer.

2. The sound wave transducer of claim 1, wherein the supporting wall of the spacer layer forms a closed supporting wall around the central region.

3. The sound wave transducer of claim 1, wherein the spacer layer comprises a plurality of supporting walls around the central region.

4. The sound wave transducer of claim 3, wherein the second metal layer is coupled to the supporting wall contacting the first metal trace.

5. The sound wave transducer of claim 1, further comprising a conductive glue layer disposed on a top portion and a sidewall of the supporting wall of the spacer layer and electrically connected to the second metal layer.

6. The sound wave transducer of claim 5, wherein the first metal layer comprises:

the first metal trace coupled to the conductive glue layer; and the second metal trace insulated from the first metal trace and covering the central region.

7. The sound wave transducer of claim 1, wherein the first board comprises a first buffer layer disposed on the first metal layer.

8. The sound wave transducer of claim 1, wherein the second board comprises a second buffer layer disposed on the second metal layer.

9. The sound wave transducer of claim 1, wherein the carrier has a thickness gradient.

10. A sound wave transducer module comprising:

a first sound wave transducer comprising:

a first bottom board comprising:

a first glass layer having a first opening formed in a central region of the first glass layer;

a first substrate layer disposed on the first glass layer and over the first opening; and a first metal layer disposed on the first substrate layer;

a first spacer layer disposed on the first bottom board and surrounding the central region of the first glass layer; and a first top board having a plurality of second openings and comprising:

a second substrate layer; and a second metal layer disposed on the first spacer layer;

a first sealant wall disposed on the first bottom board of the first sound wave transducer;

a top cover disposed on the first sealant wall; and a first signal processing circuit coupled to the first metal layer and the second metal layer.

11. The sound wave transducer module of claim 10, wherein the top cover comprises:

a second glass layer; and a first conductive layer disposed on the second glass layer.

12. The sound wave transducer module of claim 11, further comprising a second conductive layer disposed on the first glass layer of the first bottom board.

13. The sound wave transducer module of claim 12, wherein the first sealant wall, the first conductive layer and the second conductive layer are grounded.

14. The sound wave transducer module of claim 10, further comprising a second sound wave transducer, wherein the second sound wave transducer comprises:

a second bottom board comprising a third glass layer having a third opening, a third substrate layer disposed on the second glass layer, and a third metal layer disposed on the third substrate layer;

a second spacer layer disposed on the second bottom board; and a second top board having a plurality of fourth openings and comprising a fourth substrate layer and a fourth metal layer disposed on the second spacer layer.

15. The sound wave transducer module of claim 14, further comprising a second sealant wall disposed between the top cover and the first bottom board of the first sound wave transducer, and surrounding the second wave transducer.

16. The sound wave transducer module of claim 14, further comprising a second sealant wall disposed on the first bottom board of the first sound wave transducer and surrounding the second sound wave transducer.

17. The sound wave transducer module of claim 14, wherein a quantity of the second openings of the first top board of the first sound wave transducer is different from a quantity of the fourth openings of the second top board of the second sound wave transducer.

18. The sound wave transducer module of claim 14, wherein the first signal processing circuit is coupled to the second sound wave transducer.

19. The sound wave transducer module of claim 14, further comprising a second signal processing circuit coupled to the second sound wave transducer.

* * * * *